United States Patent [19]

Miki et al.

[11] Patent Number: 4,700,960
[45] Date of Patent: Oct. 20, 1987

[54] APPARATUS FOR CONTROLLING STEER ANGLE OF REAR WHEELS OF VEHICLE

[75] Inventors: Kazuo Miki, Aichi; Yasutaka Hayashi, Seto; Katsuhiko Fukui; Kazumasa Sumi, both of Nagoya, all of Japan

[73] Assignee: Kabushiki Kaisha Toyota Chuo Kenkyusho, Aichi, Japan

[21] Appl. No.: 854,412

[22] Filed: Apr. 21, 1986

[30] Foreign Application Priority Data

Apr. 25, 1985 [JP] Japan ................................. 60-89611

[51] Int. Cl.⁴ .............................................. B62D 7/00
[52] U.S. Cl. ....................................... 280/91; 180/140
[58] Field of Search ..................... 280/91, 99; 180/140, 180/142, 236

[56] References Cited

U.S. PATENT DOCUMENTS

| 4,418,780 | 12/1983 | Ito et al. | 180/142 |
| 4,441,572 | 4/1984 | Ito et al. | 180/140 |
| 4,522,417 | 6/1985 | Sano et al. | 280/91 |
| 4,527,654 | 7/1985 | Shibahata et al. | 180/140 |
| 4,552,239 | 11/1985 | Kanazawa et al. | 180/140 |
| 4,566,710 | 1/1986 | Furukawa et al. | 280/91 |
| 4,572,316 | 2/1986 | Kanazawa et al. | 180/143 |
| 4,597,462 | 7/1986 | Sano et al. | 180/140 |
| 4,598,788 | 7/1986 | Serizawa et al. | 180/140 |

FOREIGN PATENT DOCUMENTS

| 0150858 | 8/1985 | European Pat. Off. . | |
| 0165706 | 12/1985 | European Pat. Off. . | |
| 3338702 | 5/1984 | Fed. Rep. of Germany . | |
| 57-44568 | 3/1982 | Japan . | |
| 59-26367 | 2/1984 | Japan | 180/140 |
| 60-67275 | 4/1985 | Japan | 180/40 |
| 60-161265 | 8/1985 | Japan | 280/91 |
| 60-248481 | 12/1985 | Japan . | |

Primary Examiner—John J. Love
Assistant Examiner—Kenneth R. Rice
Attorney, Agent, or Firm—Parkhurst & Oliff

[57] ABSTRACT

A rear wheel steer angle controlling apparatus for vehicles having steerable front and rear wheels, adapted for controlling the steer angle or rear wheels in response to the operation of the steering wheel for steering the front wheels. The speed with which the steering wheel is turned is detected and compared with a reference value which varies in accordance with changes in a physical amount related to the vehicle velocity. When the speed of operation of the steering wheel is larger than the reference value, a rear wheel steer angle is formed in the counter direction to the direction of the front wheel steer angle, so that the response to the steering input for turning the vehicle is improved. Conversely, when the speed of operation of the steering wheel is smaller than the reference value, a rear wheel steer angle is formed in the same direction as the front wheel steer angle, thus enhancing the stability of the vehicle running straight.

20 Claims, 17 Drawing Figures

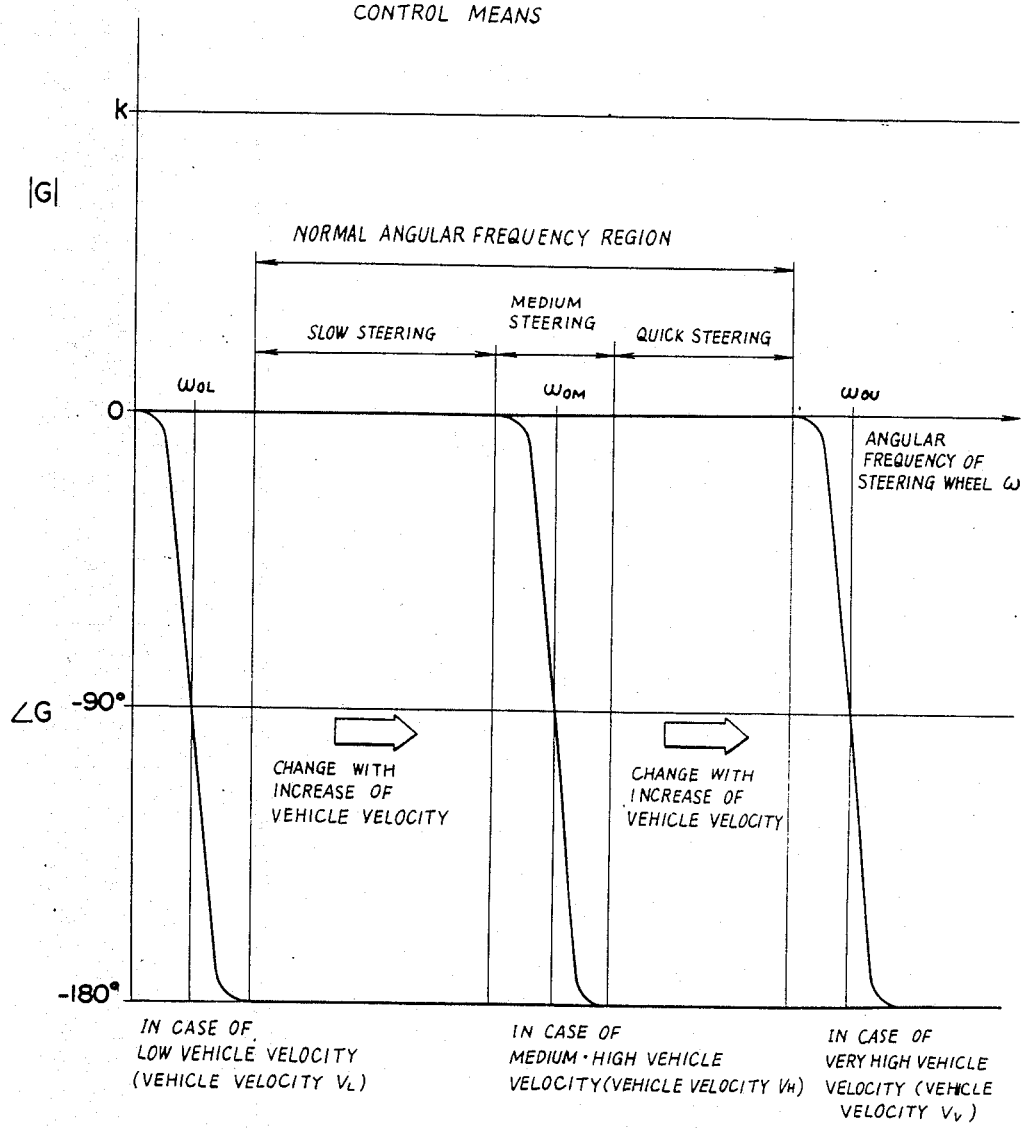

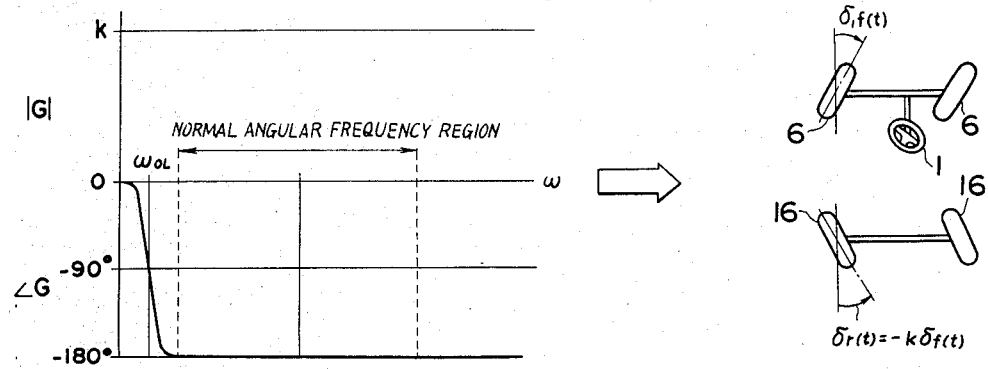
FIG-4(A) IN CASE OF LOW VEHICLE VELOCITY (VEHICLE VELOCITY $V_L$)
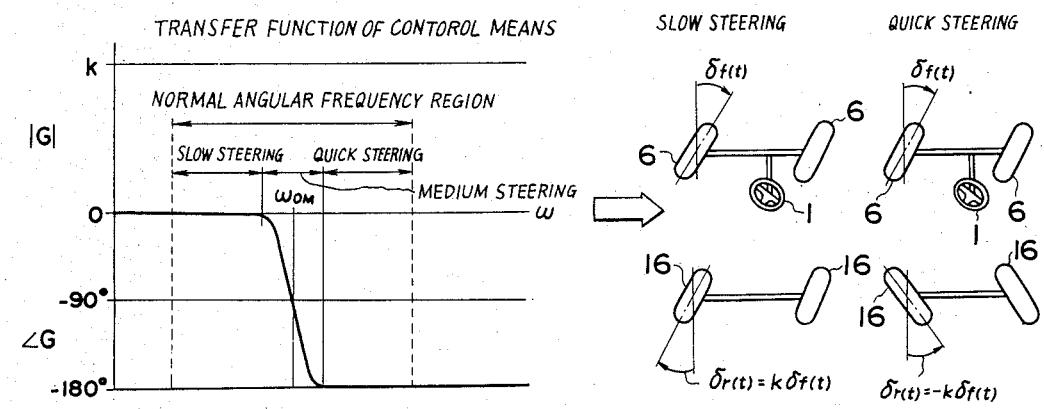
FIG-4(B) IN CASE OF MEDIUM·HIGH VEHICLE VELOCITY (VEHICLE VELOCITY $V_H$)
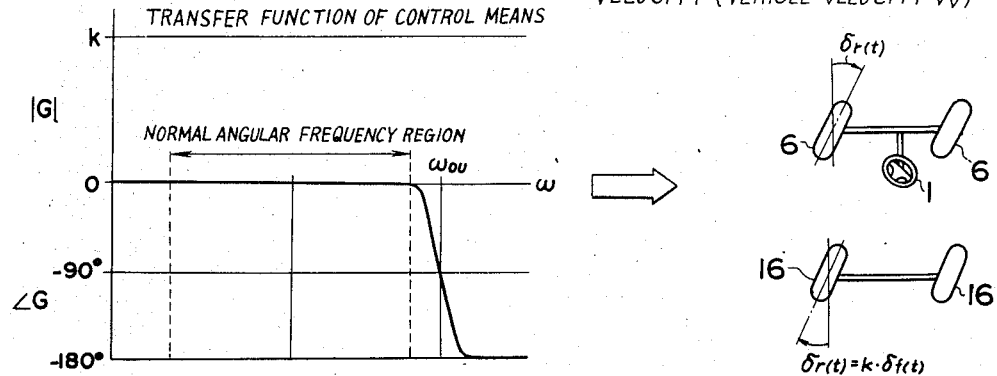
FIG-4(C) IN CASE OF VERY HIGH VEHICLE VELOCITY (VEHICLE VELOCITY $V_V$)

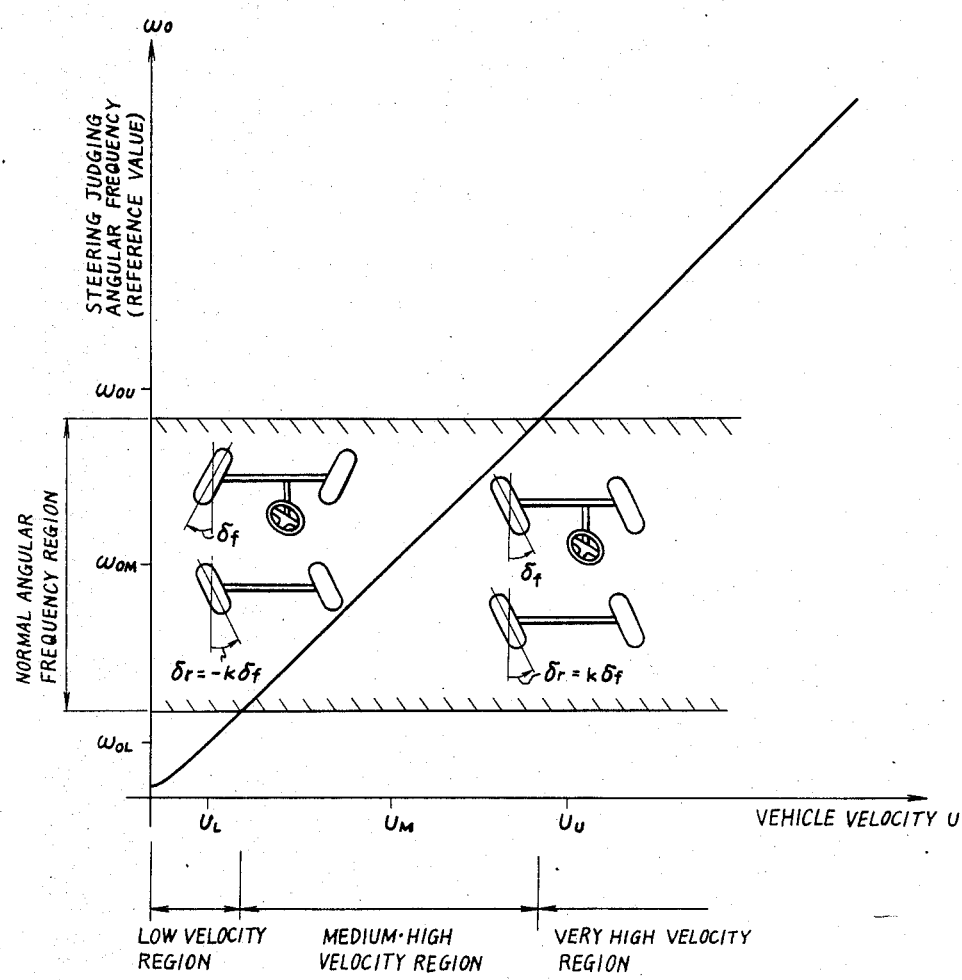

TRANSFER FUNCTION OF CONTROL MEANS

TRANSFER CHARACTERISTICS
OF PHASE SHIFTING
CIRCUIT 310

RESISTANCE CHARACTERISTICS OF
CdS 352 IN CdS OPTOISOLATOR 350

APPARATUS FOR CONTROLLING STEER ANGLE OF REAR WHEELS OF VEHICLE

BACKGROUND OF THE INVENTION

1. Field of the Invention

The present invention broadly relates to a vehicle having steerable front and rear wheels (this type of vehicle will be referred to as "4-wheel steering vehicle", hereinunder) and more, particularly, to an apparatus for automatically controlling the steer angle of the rear wheels in such a 4-wheel steering vehicle by controlling an actuator mechanism in response to the operation of a steering wheel for controlling the steer angle of front wheels.

2. Description of the Related Art

A conventional apparatus for controlling the steer angle of rear wheels in a 4-wheel steering vehicle, on which the present invention is based, will be explained hereinunder with specific reference to FIG. 2.

A rotation of a steering wheel 1 caused by the driver is transmitted through a shaft 2 to a gear box 3 and is converted into a linear motion of a linkage 4. The linear motion of the linkage 4 causes a rotation of knuckle arms 5 about their pivot points 5a, thus generating a steer angle $\delta f(t)$ of the front wheels 6, as a function of time (t). A sensor 31 associated with the shaft 2 senses the angle $\delta h(t)$ of steering rotation of the steering wheel 1, while a sensor 32 senses lateral acceleration $\dot{V}$ generated and acting on the vehicle in response to the rotation of the steering wheel 1 by the angle $\delta h(t)$. Then, a computer 40 operates an actuator 50 in accordance with the signals from the sensors 31, 32, such as to cause a linear motion of a linkage 14 through a gear box 13. The linear motion of the linkage 14 causes knuckle arms 15 to rotate about their pivot points 15a, thus generating a steer angle $\delta r(t)$ of the rear wheels 16.

The computer 40 determines the rear wheel steer angle $\delta r(t)$ as being proportional to the lateral acceleration $\dot{V}$ in accordance with the following formula (1) or, alternatively, by adding the product $h \cdot \delta f(t)$ of the front wheel steer angle $\delta f(t)$ and a proportional constant h to the right side of the formula (1) as expressed by the formula (2) below.

$$\delta r(t) = K \cdot \dot{V} \quad (1)$$

$$\delta r(t) = h \cdot \delta f(t) + K \cdot \dot{V} \quad (2)$$

This known steer angle controlling apparatus, however, is not designed to respond to the speed or rate of operation of the steering wheel. In addition, the rear wheels are steered in the same direction as the front wheels regardless of the angle of steering rotation of the steering wheel, so that the turning performance, particularly when the vehicle has to turn sharply, is not so high, although the steering stability during straight running is improved appreciably.

In another known apparatus for controlling the rear wheel steer angle in a 4-wheel steering vehicle, a steering gear for controlling the front wheels and a steering gear for controlling the rear wheels are connected mechanically in such a manner that, when the angle of rotation of the steering wheel is rather small, the rear wheels are steered in the same direction as the front wheels, whereas, when the steering wheel rotation angle is rather large, the rear wheels are steered in the direction counter to the front wheels.

In this apparatus, although the rear wheels are steered in the same direction as the front wheels or in the counter direction to the front wheels depending upon the steering wheel displacement, no consideration is made as to the control of the rear wheel steer angle in response to the speed or rate of operation of the steering wheel by the driver. The driver, when he finds it necessary to quickly steer the vehicle in order to avert from an obstacle or to change the lanes, operates the steering wheel correspondingly quickly but, when he wishes to steer the vehicle along a gentle curve, he operates the steering wheel correspondingly gently. Thus, the driver expects that the vehicle will respond to the rate or speed of operation of the steering wheel. In this known apparatus, however, the rear wheels are steered only in response to the amount of steering wheel displacement so that the vehicle does not delicately respond to the driver's will.

Thus, the above-described conventional 4-wheel steering vehicles suffer from the disadvantage that they fail to meet the driver's request who expects the vehicle to be steered in good response to the speed or rate at which he operates the steering wheel.

In order to overcome these problems, the present inventors have already proposed an apparatus for controlling the steer angle of rear wheels of a vehicle (Japanese patent application No. 102202/1984; U.S. Pat. application Ser. No. 734,332) which is capable of operating in response to the speed of the steering wheel in such a way as to satisfy both the demand for high steering response in the case where a quick turning of the vehicle is required and the demand for high straight running stability in the case where the vehicle is required to turn rather gently. This apparatus is arranged such that the steer angle of the rear wheels of the vehicle is generated in the direction counter to a direction of the steer angle of the front wheels when the steering wheel is operated at high speed, i.e., when the angular frequency of the steering wheel is high, and the steer angle of the rear wheels is generated in the same direction as the steer angle of the front wheels when the steering wheel is operated at low speed, i.e., when the angular frequency is low. According to this apparatus, therefore, when the speed of operation of the steering wheel is high, the apparatus effects control such that the steer angle of the rear wheels is set in the counter direction to the angle of steer of the front wheels. As a result, the steer angle of the front wheels and the steer angle of the rear wheels are set almost simultaneously so that forces are produced simultaneously on the front and rear wheel tires. These forces in turn form yawing moments which act to turn the vehicle in one direction, thus equivalently increasing steering gain, i.e., the ratio of the steer angle of steered wheel to the rotation angle of the steering wheel. Namely, in this case, the sum of the steer angle of the front wheels and the steer angle of the rear wheels forms an effect equivalent to the effect produced by the increased steering gain.

On the other hand, when the speed of operation of the steering wheel is small, control is effected such that the steer angle of the rear wheels is set in the same direction as the steer angle of the front wheels. In consequence, a steering effect equivalent to that produced by a steer angle equal to the difference between the front wheel steer angle and the rear wheel steer angle is obtained, resulting in a small steering gain, and thus improving the steering stability during straight running of the vehicle.

In general, as the speed of a vehicle increases, the sensitivity of turning of the vehicle with respect to the operation of the steering wheel becomes higher, so that when the vehicle is running at high speed, the vehicle may abruptly change its course or posture in response to even a small amount of rotation of the steering wheel. For this reason, when the vehicle is running at an extremely high speed, the rear wheels are preferably steered in the same direction as the steer angle of the front wheels, i.e., in the direction in which the steering gain is decreased and the straight running stability of the vehicle is thereby improved, except for the case where the steering wheel is operated at an abnormally high speed in order to cope with an emergency situation or to avert from an obstacle. On the other hand, when the vehicle is intended to be stopped or is running at an extremely low speed, it is demanded that the posture of the vehicle should be able to be changed by a large margin, i.e., the radius of turning circle of the vehicle should be able to become small, in view of the necessity of changing the course of the vehicle and garaging the same. Accordingly, when the vehicle is running at an extremely low speed, it is preferable to steer the rear wheels in the direction counter to a direction of the steer angle of the front wheels, i.e., in the direction in which the steering gain is increased and the response to the steering input for turning of the vehicle is thereby improved, except for the case where the speed of rotation of the steering wheel is so low as to be close to zero as in the case of effecting a normal circular turn.

SUMMARY OF THE INVENTION

In view of the above-described circumstances, it is a primary object of the present invention to provide a rear wheel steer angle controlling apparatus which enables improved vehicle steering characteristics to be obtained by controlling the direction and magnitude of the steer angle of the rear wheels in accordance with information corresponding to the vehicle velocity as well as the control parameters which are featured in the apparatus previously proposed by the present inventors for controlling the steer angle of rear wheels of a 4-wheel steering vehicle.

To this end, according to the present invention, there is provided a rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of the vehicle, the apparatus comprising: a steering wheel displacement detecting means for detecting a steering wheel displacement and for generating a steering wheel displacement signal representing the steering wheel displacement; a physical amount detecting means for detecting a physical amount related to a velocity of the vehicle and outputting a physical amount signal; and control means adapted to calculate a speed of operation of the steering wheel on the basis of the steering wheel displacement signal, set a reference value which varies in accordance with the physical amount signal, make a comparison between the speed of operation of the steering wheel and the reference value, and control the actuator mechanism in accordance with the result of the comparison such that: (a) when the speed of rotation of the steering wheel is smaller than the reference value, the steer angle of the rear wheels is generated in the same direction as the steer angle of the front wheels; and (b) when the speed of operation of the steering wheel is larger than the reference value, the steer angle of the rear wheels is generated in the direction counter to a direction of a steer angle of the front wheels.

According to the present invention, the amount of displacement of the steering wheel is detected by the steering wheel displacement detecting means. This steering wheel displacement is an amount corresponding to a steering angle of the steering wheel such as a rotational displacement angle of the steering wheel, a steer angle of the front wheels, etc. The physical amount detecting means detects a physical amount related to the vehicle velocity such as the vehicle velocity itself, yaw rate, lateral acceleration of the vehicle, the product of the vehicle velocity and the yaw rate, or the product of the vehicle velocity and the lateral acceleration. The control means calculates a speed of operation of the steering wheel on the basis of the steering wheel displacement signal output from the steering wheel displacement detecting means. The speed of operation of the steering wheel corresponds to the angular frequency of the steering wheel displacement signal, or the rate of change of the steering wheel displacement signal with respect to time (t), which is represented by a steering speed signal or the like. The control means sets a reference value so as to vary in accordance with the physical amount signal output from the physical amount detecting means and makes size comparison between the reference value and the speed of operation of the steering wheel. The control means controls the actuator mechanism in such a manner that the steer angle of the rear wheels is generated in the same direction as the steer angle of the front wheels when the speed of operation of the steering wheel is smaller than the reference value, and the steer angle of the rear wheels is generated in the direction counter to a direction of the steer angle of the front wheels when the speed of operation of the steering wheel is larger than the reference value.

Accordingly, when the speed of operation of the steering wheel is larger than a predetermined reference value which is determined in accordance with a physical amount related to the vehicle velocity, the control means controls the actuator mechanism such that the steer angle of the rear wheels is set in the counter direction to the angle of steer of the front wheels. As a result, the steer angle of the front wheels and the steer angle of the rear wheels are set almost simultaneously so that forces are produced simultaneously on the front and rear wheel tires. These forces in turn form yawing moments which act to turn the vehicle in one direction, thus equivalently increasing steering gain, i.e., the ratio of the steer angle of steered wheel to the rotation angle of the steering wheel. Namely, in this case, the sum of the steer angle of the front wheels and the steer angle of the rear wheels forms an effect equivalent to the effect produced by the increased steering gain. Thus, the response to the steering input for turning of the vehicle is improved. On the other hand, when the speed of operation of the steering wheel is smaller than a predetermined reference value which is determined in accordance with a physical amount related to the vehicle velocity, the control means controls the actuator mechanism such that the steer angle of the rear wheels is set in the same direction as the steer angle of the front wheels. In consequence, a steering effect equivalent to that produced by a steer angle equal to the difference between the front wheel steer angle and the rear wheel steer angle is obtained, resulting in a small steering gain, and thus improving the steering stability during straight running of the vehicle.

Thus, according to the present invention, the direction of the steer angle of the rear wheels is controlled in accordance with the result of size comparison between the speed of operation of the steering wheel and a reference value which is determined in accordance with a physical amount related to the vehicle velocity, so that it is possible to obtain optimum vehicle steering characteristics which take account of changes in a physical amount related to the vehicle velocity. More specifically, since a reference value employed to make judgement as to whether the speed of operation of the steering wheel is high or low is determined in accordance with a physical amount related to the vehicle velocity, the direction of steer angle of the rear wheels is controlled not only in accordance with the speed of operation of the steering wheel but also in accordance with the physical amount, so that it is possible to obtain vehicle steering characteristics which reflect the driver's will when he turns the steering wheel in the expectation that the vehicle will be steered with optimum characteristics for each vehicle velocity region.

BRIEF DESCRIPTION OF THE DRAWINGS

FIG. 3 is a diagram showing the transfer function of a control means used in the present invention;

FIGS. 4(A), 4(B) and 4(C) are diagrams respectively showing the transfer functions of the control means and the relationship between steer angles of the front and rear wheels at various vehicle velocities;

FIG. 5 is a diagram showing changes in the steering judging angular frequency with respect to the change of the vehicle velocity;

DETAILED DESCRIPTION OF THE PREFERRED EMBODIMENT

Figure 1:
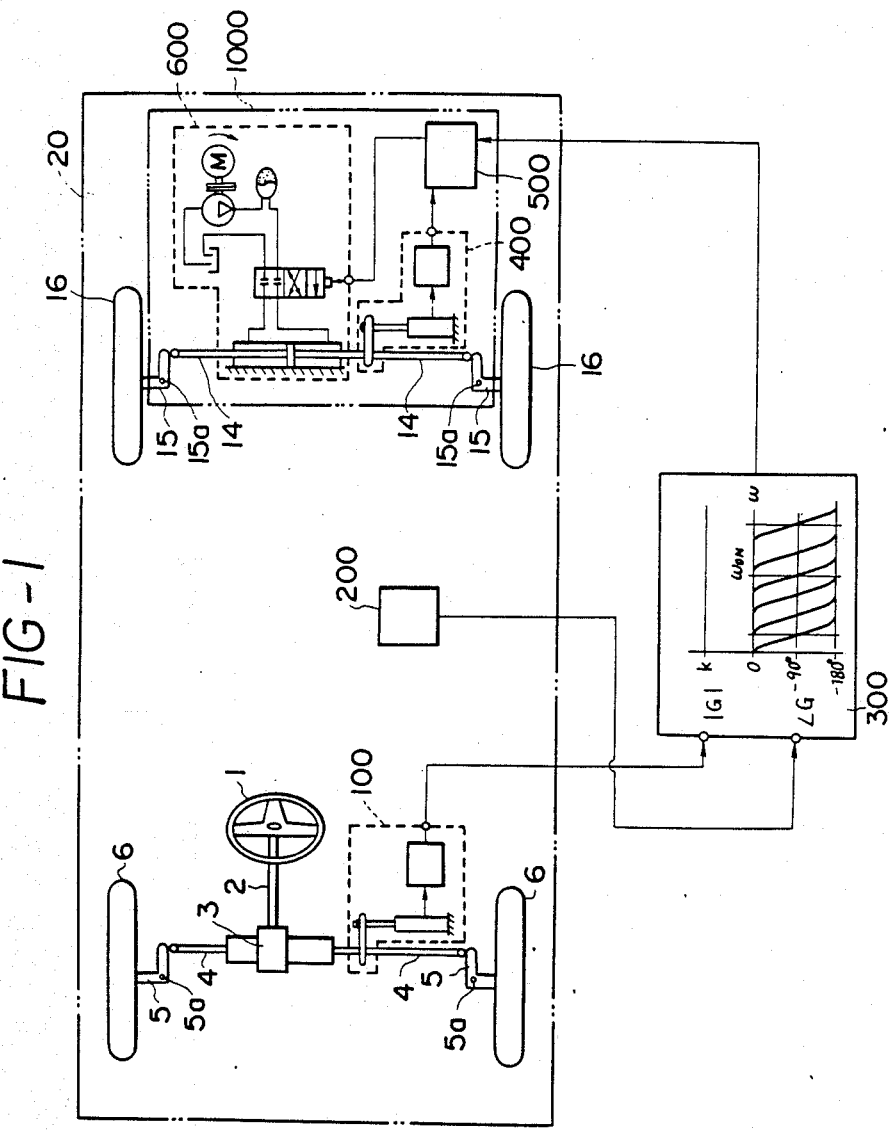
FIG. 1 is a block diagram of one embodiment of the present invention.

The present invention will be described hereinunder in detail with reference to the accompanying drawings.

The present invention can be embodied in the following practical forms.

According to a practical form of a first aspect of the present invention, the control means further comprises means for controlling the amount of the movement of said actuator mechanism in response to the level of the steering wheel displacement signal and controlling the actuator mechanism in accordance with the result of the comparison such that when the speed of operation of the steering wheel is smaller than the reference value, a steer angle of the rear wheels corresponding to the level of the steering wheel displacement signal is formed in the same direction as the steer angle of the front wheels, and that, when the speed of operation of the steering wheel is larger than the reference value, a steer angle of the rear wheels corresponding to the level of the steering wheel displacement signal is generated in the direction counter to a direction of steer angle of the front wheels.

According to the first aspect of the present invention, the direction of steer angle of the rear wheels is controlled in accordance with both the speed of operation of the steering wheel and a physical amount related to the vehicle velocity, and the magnitude of steer angle of the rear wheels is controlled in accordance with the amount of steering wheel displacement. Thus, since not only the direction of steer angle of the rear wheels but also the magnitude of steer angle of the rear wheels are controlled in accordance with the steering wheel displacement, it is possible to obtain optimum vehicle steering characteristics which reflect the driver's will when he turns the steering wheel in the expectation that the vehicle will be steered with optimum characteristics for each vehicle velocity region.

According to a practical form of a second aspect of the present invention, the control means comprises: a calculating means for calculating an angular frequency of the steering wheel corresponding to the speed of operation of the steering wheel on the basis of the steering wheel displacement signal; a setting means for setting a reference value which involves a very small value close to zero and continuously varies in accordance with changes in a physical amount related to the vehicle velocity; a judging means for making judgement as to whether the steering wheel angular frequency is larger or smaller than the reference value by making size comparison therebetween; and a processing means for controlling the actuator mechanism on the basis of the steering wheel displacement signal and the result of judgement by the judging means such that, when the steering wheel angular frequency is smaller than the reference value, the steering whel displacement signal is amplified by a predetermined amplification factor and output to the actuator mechanism, and that, when the angular frequency is larger than the reference value, the steering wheel displacement signal is inversely amplified by a predetermined amplification factor and output to the actuator mechanism.

According to the second aspect of the present invention, the angle δh(t) of rotation of the steering wheel or the displacement D of the steering wheel from a reference position corresponding to the straight running of the vehicle, i.e., an amount corresponding to the steer angle of the front wheels, is detected by the steering wheel displacement detecting means. In addition, a physical amount related to the vehicle velocity such as the vehicle velocity itself, yaw rate or the like is detected by the physical amount detecting means.

When the steering wheel rotation angle $\delta h(t)$ is detected by the steering wheel displacement detecting means, the detected angle is differentiated by time t so that the angular frequency $\omega$ of the steering wheel is detected. On the other hand, when the steering wheel displacement D is detected, the displacement D is expressed as $D=f(\omega t)$ which is a function of the angular frequency of the steering wheel. Therefore, the calculating means can obtain the speed or rate of operation of the steering wheel by calculating the angular frequency of the steering wheel by the use of the steering wheel displacement signal output from the detecting means. The setting means sets a reference value $\omega_O$ which involves a very small value close to zero and which continuously varies with changes in a physical amount related to the vehicle velocity. The judging means judges a speed or rate of operation of the steering wheel by making size comparison between the angular frequency $\omega$ of the steering wheel which corresponds to the speed of operation of the steering wheel and the reference value $\omega_O$ set by the setting means. More specifically, when $\omega < \omega_O$, the judging means judges the steering wheel operation speed to be low or slow, whereas, when $\omega_O < \omega$, the means judges the speed to be high or fast. The processing means controls the actuator mechanism on the basis of the result of judgement by the judging means and the level of the steering wheel displacement signal. More specifically, when $\omega < \omega_O$, i.e., the steering wheel operation speed is low or slow, the processing means amplifies the steering wheel displacement signal by a predetermined amplification factor k and outputs the thus amplified signal, whereby the actuator mechanism is controlled such that a steer angle of the rear wheels corresponding to the level of the steering wheel displacement signal is generated in the same direction as the steer angle of the front wheels.

On the other hand, when $\omega_O < \omega$, i.e., the steering wheel operation speed is high or fast, the processing means inverts the steering wheel displacement signal (i.e., the signal is multiplied by $-1$ so that the polarity is inverted) and amplifies this signal by a predetermined amplification factor k and outputs the thus amplified signal, whereby the actuator mechanism is controlled such that a steer angle of the rear wheels corresponding to the level of the steering wheel displacement signal is generated in the direction counter to a direction of steer angle of the front wheels.

Thus, the actuator mechanism is controlled by the signal formed by multiplying the steering wheel displacement signal by k such that a steer angle of the rear wheels which is proportional to the amount of the steering wheel displacement is generated in the same direction as the steer angle of the front wheels.

On the other hand, when the signal which is formed by multiplying the steering wheel displacement signal by $-k$ is generated, the actuator mechanism is controlled by this signal such that a steer angle of the rear wheels which is proportional to the amount of steering wheel displacement is generated in the direction counter to a direction of steer angle of the front wheels.

As has been described above, according to the second aspect of the present invention, it is possible to control the direction of steer angle of the rear wheels by making size comparison between the steering wheel angular frequency $\omega$ and the reference value $\omega_O$. In addition, the reference value $\omega_O$ which is employed to judge the speed of operation of the steering wheel can be continuously varied from a very small value close to zero in accordance with changes in a physical amount related to the vehicle velocity. Accordingly, it is possible to continuously set the direction of steer angle of the rear wheels so that it is suitable for each vehicle velocity region.

According to a practical form of a third aspect of the present invention, the control means comprises: a calculating means for calculating a steering wheel angular frequency corresponding to the speed of operation of the steering wheel on the basis of the steering wheel displacement signal; a setting means for setting a reference value which progressively increases from a very small value close to zero as the physical amount related to the vehicle velocity increases; a judging means for making judgement as to whether the angular frequency is larger or smaller than the reference value by making size comparison therebetween; and a processing means for controlling the direction of the movement in the actuator mechanism on the basis of the result of judgement by the judging means and controlling the amount of the movement in the actuator mechanism in response to the level of the steering wheel displacement signal such that, when the steering wheel angular frequency is smaller than the reference value, a steer angle of the rear wheels corresponding to the level of the steering wheel displacement signal is generated in the same direction as the steer angle of the front wheels, and that, when the angular frequency is larger than the reference value, a steer angle of the rear wheels corresponding to the level of the steering wheel displacement signal is generated in the direction counter to a direction of steer angle of the front wheels.

The practical form of the third aspect of the present invention will be described hereinunder in detail with specific reference to FIGS. 3 to 5. It is to be noted here that the respective actions and effects of the setting means, the judging means and the processing means, which constitute in combination the control means, will not be explained separately from each other due to the convenience of explanation. In addition, for the simplification of the explanation, the vehicle velocity itself will be taken as an example of a physical amount related to the vehicle velocity. The control means processes the steering wheel displacement signal on the basis of the level of the steering wheel displacement signal and the level of the vehicle velocity signal as a physical amount signal and in accordance with the transfer function shown in FIG. 3. In FIG. 3, $|G|$ represents gain, while $\angle G$ represents phase.

As shown in FIG. 4(B), when the vehicle is running at a speed within the medium-high vehicle velocity region (within the velocity region $V_M$ shown in FIG. 3, as a representative example), the steering wheel displacement signal is output after it has been multiplied by k when the steering wheel angular frequency $\omega$ is smaller than the reference value $\omega_{OM}$ in the case of the vehicle velocity region $V_H$, i.e., when the operation of the steering wheel is slow in the diagram shown in FIG. 3. In this case, the control means controls the actuator mechanism such that a steer angle of the rear wheels is generated in the same direction as the steer angle of the front wheels. On the other hand, when the steering wheel angular frequency $\omega$ is larger than the reference value $\omega_{OM}$, i.e., in the case of quick steering in the diagram shown in FIG. 3, the steering wheel displacement signal is multiplied by k and output as a signal with a 180° phase delay, i.e., the steering wheel displacement signal is output after it has been multiplied by $-k$. In this case, the actuator mechanism is controlled by the control means such that a steer angle of the rear wheels is generated in the direction counter to the steer angle of the front wheels. When the steering wheel angular frequency $\omega$ is near the reference value $\omega_{OM}$, i.e., the speed of operation of the steering wheel falls in the medium region between the slow and quick steering regions in the diagram shown in FIG. 3, the steering wheel displacement signal is multiplied by k and output as a signal with a phase delay which is variable within the range from 0° to 180°. For example, when the vehicle is running at the vehicle velocity $V_M$ and the steering wheel angular frequency $\omega$ is equal to the reference value $\omega_{OM}$, the steering wheel displacement signal is shifted so as to have a 90° phase delay. In this case, the actuator mechanism is controlled such that the steer angle of the rear wheels is zero.

Referring now to FIG. 4(A), in the case of the low vehicle velocity region (in the case of the vehicle velocity $V_L$ in FIG. 3), the reference value employed to judge the speed of operation of the steering wheel becomes smaller as the vehicle velocity lowers, so that, in the case of the low vehicle velocity region $V_L$, the reference value takes a value $\omega_{OL}$ (a very small value close to zero) corresponding to an angular frequency of the steering wheel at the time when it is turned at an extremely low speed. Accordingly, when the steering wheel is turned at normal speed, the steering wheel displacement signal is multiplied by k and output as a signal with a 180° phase delay (i.e., the signal is output after it has been multiplied by $-k$), except for the case when the steering wheel is turned at an extremely low speed as in the case where the driver effects a normal circular turn of the vehicle by maintaining the magnitude of the angle of rotation of the steering wheel at a constant level. In such a case, the control means controls the actuator mechanism such that a steer angle of the rear wheels is generated in the direction counter to the steer angle of the front wheels.

Referring next to FIG. 4(C), when the vehicle is running at a speed within the very high vehicle velocity region (within the vehicle velocity region $V_V$ in the diagram shown in FIG. 3), the reference value takes a higher frequency value as the vehicle velocity increases, so that, within the vehicle velocity region $V_V$, the reference value takes a value $\omega_{OV}$ corresponding to an angular frequency of the steering wheel at the time when it is turned at an extremely high speed. Accordingly, the steering wheel displacement signal is output after it has been multiplied by k when the steering wheel is turned at normal speed, except for the case where the steering wheel is turned at an extraordinarily high speed in order to cope with an emergency situation or to avert from an obstacle. In such a case, the actuator mechanism is controlled by the control means such that a steer angle of the rear wheels is set in the same direction as the steer angle of the front wheels.

FIG. 5 is a diagram showing one example of the relationship between the vehicle velocity and the reference value (i.e., the steering wheel angular frequency )$\omega_O$ which is employed to judge the speed of operation of the steering wheel (the gradient of the straight line shown in FIG. 5 can take various values). As will be understood from FIG. 5, the reference value $\omega_O$ progressively increases as the vehicle velocity becomes higher.

As has been described above, when the speed of operation of the steering wheel, i.e., the steering wheel angular frequency, is larger than the reference value, the control means controls the actuator mechanism such that a steer angle of the rear wheels is generated in the direction counter to the steer angle of the front wheels. As a result, the steer angle of the front wheels and the steer angle of the rear wheels are set almost simultaneously so that forces are produced simultaneously on the front and rear wheel tires. These forces in turn form yawing moments which act to turn the vehicle in one direction, thus equivalently increasing steering gain, i.e., the ratio of the steer angle of steered wheel to the rotation angle of the steering wheel. Namely, in this case, the sum of the steer angle of the front wheels and the steer angle of the rear wheels forms an effect equivalent to the effect produced by the increased steering gain, so that the response to the steering input for turning of the vehicle is improved. On the other hand, when the speed of operation of the steering wheel, i.e., the steering wheel angular frequency, is smaller than the reference value, the control means controls the actuator mechanism such that a steer angle of the rear wheels is generated in the same direction as the steer angle of the front wheels. In consequence, a steering effect equivalent to that produced by a steer angle equal to the difference between the front wheel steer angle and the rear wheel steer angle is obtained, resulting in a small steering gain, and thus improving the steering stability during straight running of the vehicle.

It is to be noted that the above explanation with reference to FIG. 5 has been made by way of an example in which the reference value is proportional to the vehicle velocity, but this practical form of the present invention is not necessarily limitative thereto, and any type of reference value may be employed, provided that the reference value employed is an increasing function of the vehicle velocity. In addition, although the vehicle velocity has been taken as an example of a physical amount in the above description, it is possible to employ other physical amounts, provided that the physical amount employed is related to the vehicle velocity. In this case, it is necessary to employ an absolute value signal (a positive polarlity signal) of the physical amount signal.

As has been described above, according to the third aspect of the present invention, a size comparison is made between the steering wheel angular frequency $\omega$ corresponding to the speed of the rotation of the steering wheel and a predetermined steering wheel angular frequency $\omega_0$ which is a predetermined reference value for the speed of rotation of the steering wheel, and to speed of operation of the steering wheel is judged from the result of the comparison. In addition, the predetermined steering wheel angular frequency $\omega_0$ continuously increases from a very small value close to zero in accordance with changes in a physical amount related to the vehicle velocity. Accordingly, it is possible to employ a relatively small value as a predetermined steering wheel angular frequency $\omega_0$, i.e., the reference value, when the vehicle is running at rather low speed, and continuously increase the value of the angular frequency $\omega_0$ as the vehicle velocity becomes higher. It is therefore possible to increase the reference value for the speed of rotation of the steering wheel in accordance with the increase of the vehicle velocity, so that it is possible to to set a direction of steer angle of the rear wheels suitable for each vehicle velocity region.

More specifically, according to the third aspect of the present invention, the following advantages are obtained.

Namely, while the vehicle is running at speed within the medium-high velocity region, when the steering wheel is steered quickly, i.e., the angular frequency of the steering wheel is relatively high, the steering gain is increased to improve the response to the steering input for a quick turn of the vehicle. On the other hand, when the steering wheel angular frequency is relatively low, the steering gain is decreased to prevent the oscillation or other undesirable movements of the vehicle, thus improving the steering stability during straight running of the vehicle. When the vehicle is running at speed within the low velocity region (except for the case where the steering wheel is turned at an extraordinarily low speed as in the case of effecting a normal circular turn), the radius of turning circle is reduced by steering the rear wheels in the direction counter to a direction of steer angle of the front wheels, thus facilitating garaging and changing the course of the vehicle. In addition, when the vehicle is running at speed within the very high velocity region (except for the case where the steering wheel is turned at an extraordinarily high speed in order to cope with an emergency situation or to avert from an obstacle), the rear wheels are steered in the same direction as the front wheels, thereby preventing any sudden rise in sensitivity of the vehicle to a steering input for turning of the vehicle, and thus allowing stable running of the vehicle.

According to a practical form of a fourth aspect of the present invention, the control means controls the actuator mechanism in accordance with the result of comparison between the speed of operation of the steering wheel and the reference value such that a steer angle of the rear wheels corresponding to the level of the steering wheel displacement signal is generated in the same direction as the steer angle of the front wheels when the speed of operation of the steering wheel is smaller than the reference value and that a steer angle of the rear wheels corresponding to the level of the steering wheel displacement signal is generated in the direction counter to the steer angle of the front wheels when the speed of operation of the steering wheel is larger than the reference value. In this control operation, according to the fourth aspect fo the present invention, the ratio of the magnitude of steer angle of the rear wheels to the level of the steering wheel displacement signal is made adjustable. According to this practical form, therefore, the gain k (corresponding to the aforementioned predetermined amplification factor k) of transfer function of the steering wheel displacement signal with respect to the output of the control means is made variable and can, therefore, be set in advance. As to k, it is possible to set any value which satisfy the condition of $0 \leq k \leq 1$. For example, if k=0, the output of the control means is a zero signal which controls the actuator mechanism such that the steer angle of the rear wheels is zero, so that it is possible to attain steering characteristics of a conventional vehicle in which only the two front wheels are steerable.

According to the fourth aspect of the present invention, therefore, it is possible to set in advance the magnitude of steer angle of the rear wheels with respect to the angle of rotation of the steering wheel by controlling the actuator mechanism through the control means. Accordingly, the magnitude of steer angle fo the rear wheels can be set so as to be optimum and according to the driver's preference.

In a practical form of a fifth aspect of the present invention, a size comparision is made between the speed of operation of the steering wheel and a reference value which varies in accordance with a physical amount signal, and the actuator mechanism is controlled in accordance with the result of the comparision such that a steer angle of the rear wheels is generated in the same direction as the steer angle of the front wheels when the speed of operation of the steering wheel is smaller than the reference value and that a steer angle of the rear wheels is generated in the direction counter to the steer angle of the front wheels when the speed of operation of the steering wheel is larger than the reference value. In this control operation, according to the fifth aspect of the present invention, the rate of change of the reference value, which varies in accordance with the physical amount signal, is made adjustable.

Figure 7:
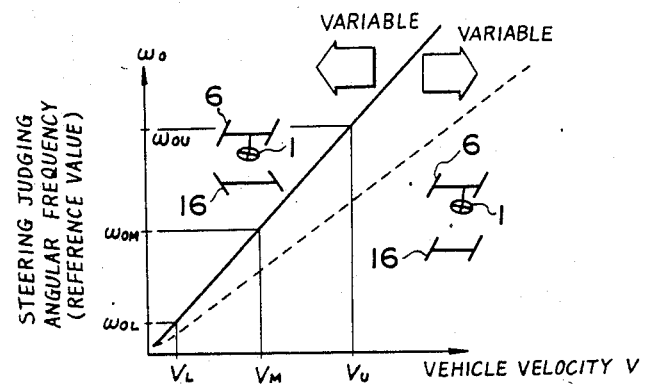
FIG. 7 is a diagram showing changes in the rate of change of the steering judging angular frequency.

According to the fifth aspect of the present invention, as shown in FIG. 7, the rate of change of the steering judging angular frequency (i.e., the reference value) with respect to a physical amount (the vehicle velocity itself is employed as one example of a physical amount in FIG. 7) related to the vehicle velocity, i.e., the gradient of the straight line, is made variable, so that it is possible to set in advance a reference value which varies at a predetermined rate of change.

As an extreme example, if the rate of change of a predetermined steering judging angular frequency $\omega_0$ is changed so that the gradient of the straight line is set at 0, i.e., the straight line coincides with the axis of abscissa in FIG. 7, it is possible to make the control means control the actuator mechanism so as to steer the rear wheels in the direction counter to the front wheels at all times. On the other hand, if the rate of change of the angular frequency $\omega_0$ is changed so that the gradient of the straight line is set at $\infty$, i.e., the straight line coincides with the axis of coordinate in FIG. 7, it is possible to make the control means control the actuator mechanism so as to steer the rear wheels in the same direction as the front wheels at all times.

Thus, according to the fifth aspect of the present invention, it is possible for the control means to set in advance a predetermined rate of change of a predetermined steering wheel angular frequency $\omega_0$ with respect to a physical amount related to the vehicle velocity. Accordingly, the control means can control the actuator mechanism such that an optimum direction of steer angle of the rear wheels is set for a physical amount corresponding to each vehicle velocity, and that direction can also be set according to the driver's preference.

One preferred embodiment of the present invention will be described hereinunder in detail with reference to the accompanying drawings.

Figure 2:
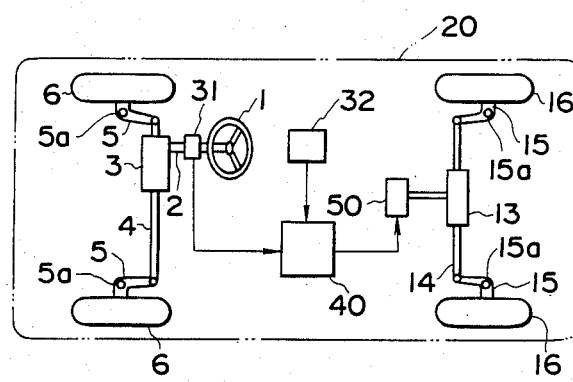
FIG. 2 is a block diagram of a conventional rear wheel steer angle controlling apparatus for 4-wheel steering vehicles.
Figure 6:
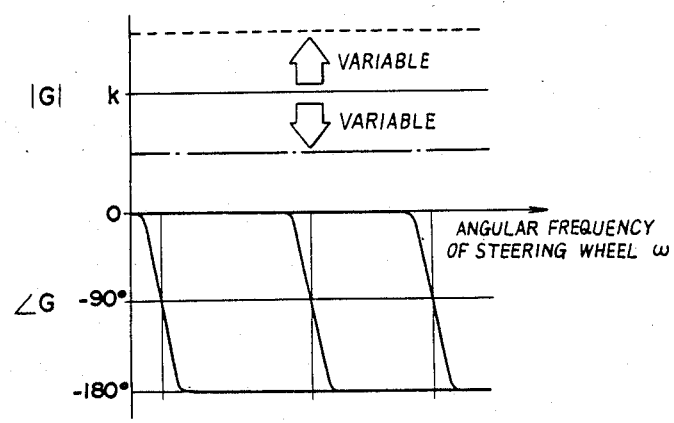
FIG. 6 is a diagram showing changes in gain of the transfer function of the control means.

FIG. 1 is a schematic illustration of one embodiment of the present invention. The portions or members shown in FIG. 1 which correspond to those shown in FIG. 2 are denoted by the same reference numerals, and description thereof is omitted.

The linkage 4 is provided with a steering wheel displacement detector 100 for detecting the amount of displacement of the steering wheel 1 corresponding to the angle of rotation thereof (the displacement amount also corresponds to the steer angle of the front wheels 6). The steering wheel displacement detector 100 is connected to a signal processing circuit 300. The circuit 300 is connected with a vehicle velocity detector 200 for detecting a velocity of the vehicle. The signal processing circuit 300 judges a speed of rotation of the steering wheel 1 on the basis of the steering wheel displacement signal output from the steering wheel displacement detector 100, and processes the steering wheel displacement signal on the basis of the result of the judgement and the vehicle velocity signal output from the vehicle velocity detector 200, thus outputting a rear wheel steer angle command signal. The linkage 14 connected to the rear wheels 16 is provided with a rear wheel steer angle detector 400 for detecting a steering amount corresponding to the steer angle of the rear wheels 16. In addition, a hydraulic device 600 for generating hydraulic presssure is mounted on the linkage 14. The rear wheel steer angle detector 400 and the signal processing circuit 300 are connected to a differential amplifier circuit 500. The circuit 500 amplifies an offset signal representing a difference between a rear wheel steer angle command signal output from the signal processing circuit 300 and an actually measured rear wheel steer angle signal which is output from the rear wheel steer angle detector 400, and outputs the amplified offset signal to the hydraulic device 600. The steering wheel displacement detector 100, the vehicle velocity detector 200 and the signal processing circuit 300 serve as a steering wheel displacement detecting means, a physical amount detecting means and a control means, respectively. The linkage 14, the knuckle arms 15, the rear wheel steer angle detector 400, the differential amplifier circuit 500 and the hydraulic device 600 serve in combination as an actuator mechanism 1000.

Each of the essential portions of this embodiment will be described hereinunder in detail.

Figure 8:
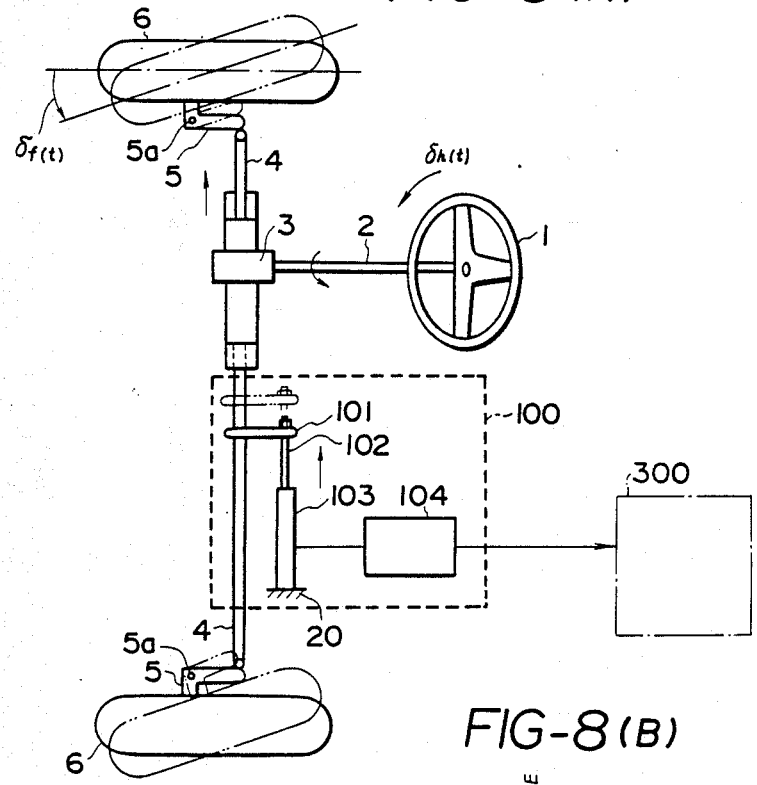
FIG. 8(A) shows the detail of a steering wheel displacement detector used in the embodiment.
FIG. 8(B) is a diagram showing a steering wheel displacement signal.
Figure 8:
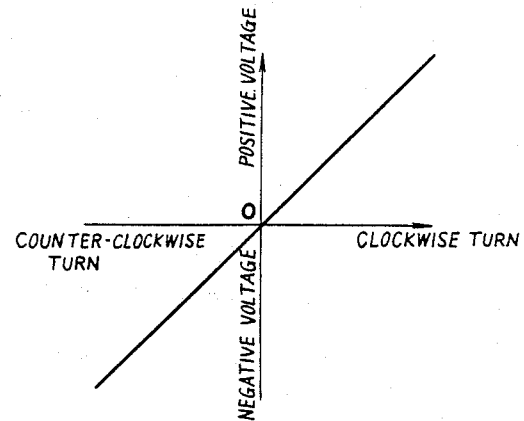

The steering wheel displacement detector 100 is, as shown in FIG. 8(A), constituted by a linear potentiometer 103, a D.C. amplififer 104 and a connecting member 101. The linear potentiometer 103 is fixed at one end thereof to the chassis 20 of the vehicle and has a sliding end 102 retained by the connecting member 101 which makes a linear motion together with the linkage 4. Thus, the sliding end 102 linearly moves with the linkage 4 through the connecting member 101 in correspondence with the angle of rotation of the steering wheel 1, and the potentiometer 103 detects this linear motion as a displacement corresponding to the rotation angle of the steering wheel 1, and outputs a corresponding electric signal. This steering wheel displacement is an amount which also corresponds to the steer angle of the front wheels 6. The D.C. amplififer 104 applies a predetermined voltage to the linear potentiometer 103, amplifies the electric signal from the linear potentiometer 103, and outputs the amplified signal as a steering wheel displacement signal to the signal processing circuit 300. The polarity of this steering wheel displacement signal is determined by the D.C. amplifier 104. More specifically, as shown in FIG. 8(B), the steering wheel displacement signal takes the form of a positive voltage signal when the front wheels 6 are steered clockwise in response to clockwise rotation of the steering wheel 1 with respect to a position corresponding to the steering wheel 1 during straight running of the vehicle, and the form of a negative voltage signal when the front wheels 6 are steered counterclockwise.

Figure 9:
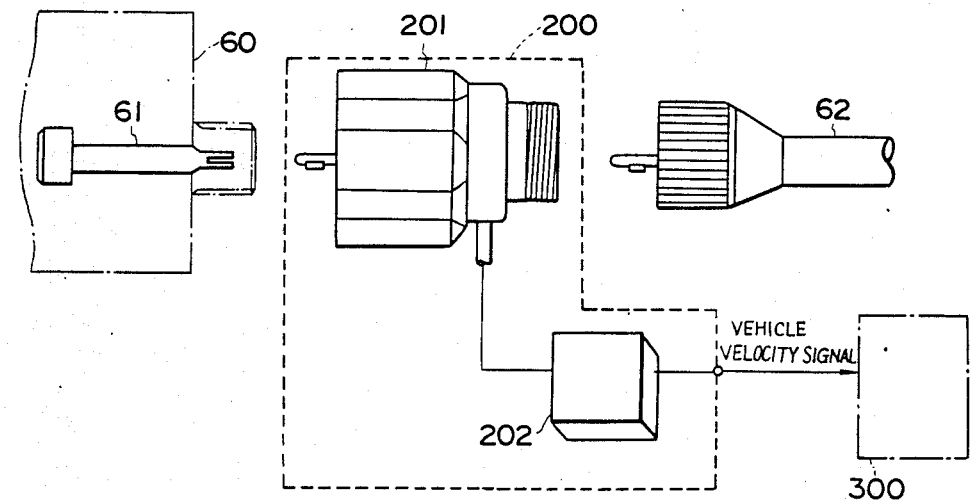
FIG. 9(A) shows the detail of a vehicle velocity detector used in the embodiment.
FIG. 9(B) is a diagram showing a vehicle velocity signal.
Figure 9:
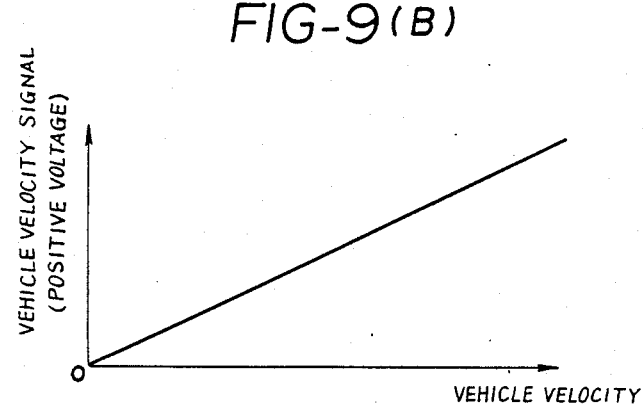

The vehicle velocity detector 200 is, as shown in FIG. 9(A), constituted by a generator 201 and a vehicle velocity meter 202. The generator 201 is attached to the portion of a transmission extension housing 60 through which a speed meter cable 62 is extended, and is connected between a speed meter driven gear 61 in the housing 60 and rotatable at a speed corresponing to the vehicle velocity and the speed meter cable 62 for transmitting the rotation speed corresponding to th vehicle speed to the speed meter, such as to generate an A.C. voltage corresponding to the rotation speed. The vehicle velocity meter 202 serves to lower the A.C. voltage when the voltage is too high, and conducts a full-wave rectification of the A.C. voltage, thus forming a ripple voltage. The ripple voltage is then changed into a positive D.C. voltage signal shown in FIG. 9(B) through smoothing by a filter. The vehicle velocity meter 202 delivers this D.C. voltage as the vehicle velocity signal to the signal processing circuit 300.

Even when a vehicle velocity having negative polarity is generated in response to a backward movement of the vehicle, a positive voltage signal as shown in FIG. 9(B) is generated by the above-described full-wave rectification.

Figure 10:
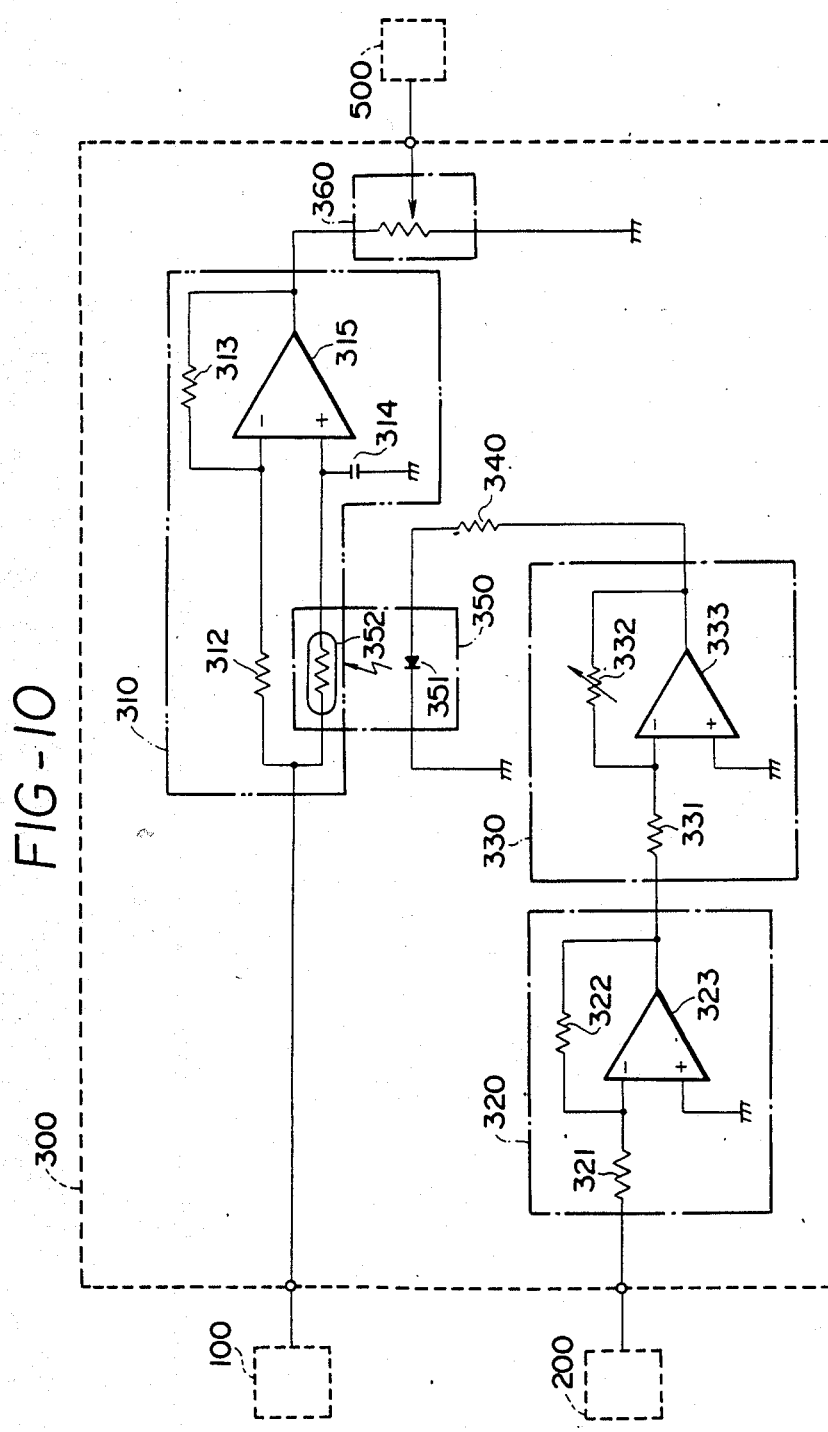
FIG. 10 is a circuit diagram of a signal processing circuit used in the embodiment.

The signal processing circuit 300 is, as shown in FIG. 10, constituted by a phase shifting circuit 310, inverting amplifier circuits 320, 330, a resistor 340, a CdS optoisolator 350 and a variable resistor 360. Due to the convenience of description, the phase shifting circuit 310 and the CdS optosiolator 350 shown in FIG. 10 include a constituent element, i.e., a CdS 352, in common. The phase shifting circuit 310 is connected to the steering wheel displacement detector 100 and is supplied with an electric signal (displacement signal) D corresponding to the amount by which the steering wheel 1 is turned. The phase shifting circuit 310 is constituted by an operational amplifier 315, resistors 312, 313, a CdS 352 and a capacitor 314. The resistor 312 serving as an input resistor and the resistor 313 serving as a feedback resistor have an equal resistance value.

In order to simplify the explanation, it is assumed here that the steering wheel 1 is continuously operated in the form of a sine wave at an angular frequency of $\omega$. Since the rotation angle $\delta h(t)$ of the steering wheel 1 is expressed as $\omega t$, the displacement of the steering wheel 1 corresponding to the rotation angle $\omega t$ from the reference position corresponding to the straight direction is expressed by $\delta h_0 \cdot \sin \omega t$, where $\delta h_0$ represents the maximum rotation of the steering wheel 1. Consequently, the displacement signal D output from the linear potentiometer 103 through the D.C. amplifier 104 is obtained as a continuous sine wave voltage signal having an maximum rotation $D_0$ corresponding to the amplitude of the steering wheel 1 and an angular frequency $\omega$, expressed by $D = D_0 \cdot \sin t$.

When the angular frequency $\omega$ of the displacement signal D as the input is as small as nearly zero, the capacitor 314 of the phase shifting circuit 310 exhibits a reactance which approaches the infinity, so that the positive terminal of the operational amplifier 315 receives a signal through the CdS 352 supplied at one end therof with the displacement signal D. The displacement signal D is also supplied to the input resistor 312. Since the ratio of resistance between the input resistor 312 and the feedback resistor 313 is 1, a signal having a gain of $-1$ is obtained from the signal input to the negative terminal of the operational amplifier 315. On the other hand, a signal having a gain of 2 is produced from the signal delivered to the positive terminal of the operational amplifier 315. In consequence, the phase shifting circuit 310 as a whole produces an output of gain of 1 which is obtained by subtracting 1 from 2 $(2-1=1)$. Therefore, when the angular frequency of the displacement signal D is as small as nearly zero, an output signal D equal to the input displacement signal D is output from the phase shifting circuit 301.

On the other hand, when the angular frequency ω of the displacement signal D is as large as nearly infinity, the capacitor 314 is practically short-circuited and the condition is practically equivalent to the case where the positive terminal of the operational amplifier 315 is grounded. In this case, only the negative terminal of the operational amplifier 315 receives the input signal, so that the phase shifting circuit 310 functions only as an inverting amplifier which provides a gain of −1 because the ratio of resistance between the input resistor 312 an the feedback resistor 313 is 1. Therefore, when the angular frequency ω of the displacement signal D is as large as nearly infinity, an inverted signal −D is obtained in response to the input displacement signal D. Thus, the output signal −D has an absolute value (amplitude $D_0$) equal to that of the input signal and a phase delay of 180° with respect to the input signal.

Figure 11A:
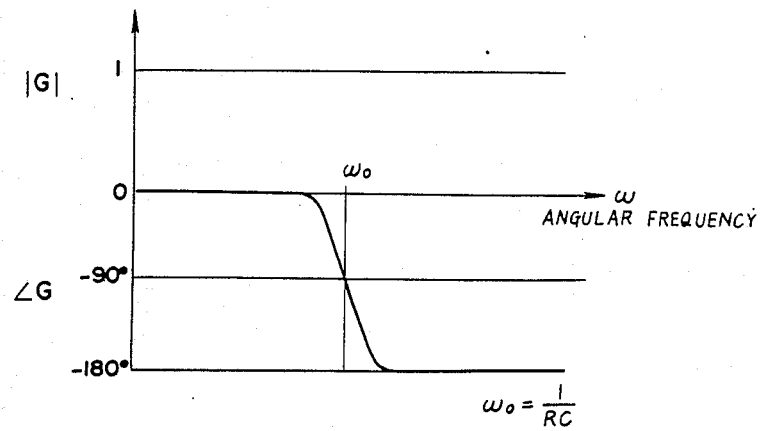
FIG. 11(A) is a diagram showing the transfer characteristics of a phase shifting circuit incorporated in the signal processing circuit.

By the principle as explained hereinbefore, the phase shifting circuit 310 produces an output with a phase delay with respect to the input displacement signal D, the phase delay varying within the range of between 0° and 180° in accordance with the angular frequency of the displacement signal D. The transfer characteristics (in relation to the input and output) of the phase shifting circuit 310 are shown in FIG. 11(A). Referring to the transfer characteristics of the phase shifting circuit 310, the angular frequency $\omega_0$ at which the phase is delayed 90°, i.e., the reference value, is determined by the resistance value R of the CdS 352 and the capacitance C of the capacitor 314 as follows:

$$\omega_0 = 1/RC$$

Accordingly, when the resistance value R of the CdS 352 changes, the angular frequency $\omega_0$ at which the phase is delayed 90° also changes, and if the CdS has such characteristics that the resistance value R decreases in accordance with the vehicle velocity V, the angular frequency $\omega_0$ increases in accordance with the increase of the vehicle velocity V. Thus, by changing the angular frequency $\omega_0$ in this manner, it is possible to attain the characteristics shown in FIGS. 3, 4 and 5.

The inverting amplifier circuit 320 is connected to the vehicle velocity detector 200 and is supplied with an electric signal (vehicle velocity signal) corresponding to the vehicle velocity V. The inverting amplifier circuit 320 is constituted by an operational amplifier 323 grounded at a positive terminal thereof, an input resistor 321 and a feedback resistor 322. The inverting amplifier circuit 320 inversely amplifies the vehicle velocity signal which is supplied from the vehicle velocity detector 200 to one end of the input resistor 321 by an amplification factor which is determined by the ratio of resistance between the input resistor 321 and the feedback resistor 322, and ouputs the thus amplified signal. The inverting amplifier circuit 330 is constituted by an operational amplifier 333 grounded at a positive terminal thereof, and input resistor 331, and a feedback resistor 332 whose resistance value is variable by a manual operation. This inverting amplifier circuit 330 inversely amplifies the signal which is supplied from the inverting amplifier circuit 320 to one end of the input resistor 331 by an amplification factor which is determined by the ratio of resistance between the input resistor 331 and the feedback resistor (variable resistor) 332.

One end of the resistor 340 is connected to the output terminal of the inverting amplifier circuit 330, and the other end of the resistor 340 is connected to the anode of a light-emitting diode 351 which constitutes the CdS optoisolator 350. The cathode of the light-emitting diode 351 is grounded. The inverting amplifier circuit 320, 330 and the resistor 340 are all employed so that the vehicle velocity signal conforms with the rating (the rated capacity of voltage and current values) of the light-emitting diode 351 of the CdS optoisolator 350. An electric signal output from the resistor 340 is a positive voltage signal which increases in accordance with the increase of the vehicle velocity in a manner similar to the vehicle velocity signal shown in FIG. 9(B), and the rate of increase (the rate of change which corresponds to the gradient of the straight line shown in FIG. 9(B)) of the electric signal is determined by the inverting amplifier circuits 320, 330 and the resistor 340. Since the resistance value of the feedback resistor (variable resistor) 332 of the inverting amplifier circuit 330 is variable by a manual operation, the aforementioned rate of increase of the signal can be manually varied, and this corresponds to a means for realizing the practical form of the fifth aspect of the present invention.

Figure 11B:
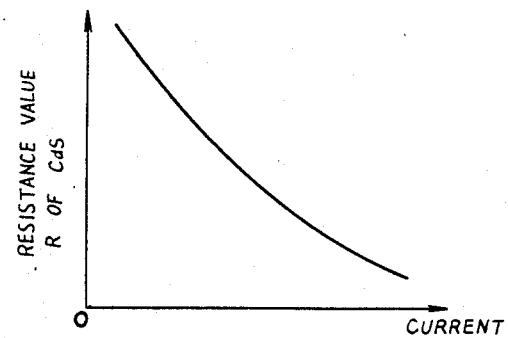
FIG. 11(B) is a diagram showing the resistance characteristics of a CdS optoisolator incorporated in the signal processing circuit.

The CdS optoisolator 350 is composed of the light-emitting diode 351 and the CdS 352. The light-emitting diode 351 is connected at one end thereof to the resistor 340 and grounded at the other end thereof. The diode 351 emits light in correspondence with the magnitude of the current flowing therethrough, i.e., the voltage supplied thereto from the resistor 340, so that, as the current increases, the radiant power output of the diode 351 increases. The CdS corresponds to the input resistor on the positive terminal side of the operational amplifier 315 in the phase shifting circuit 310 and is constituted by a photoconductive cell whose electric conductivity (resistance value) varies with the irradiation by the light emitted from the light-emitting diode 351. In addition, the CdS 352 has characteristics as shown in FIG. 11(B). Namely, the resistance value of the CdS 352 decreases in acccrdance with the increase of current flowing through the light-emitting diode 351, i.e., the increase in radiant power output of the diode 351, as shown in FIG. 11(B). Accordingly, the resistance value of the CdS 352 decreases in accordance with the increase in voltage of the electric signal supplied to the light-emitting diode 351 from the resistor 340. The voltage of this electic signal corresponds to the vehicle velocity signal. Since the angular frequency $\omega_0 = 1/RC$ at which the phase is delayed 90° by the phase shifting circuit 310 is proportional to the reciprocal of the resistance value R of the CdS 352 as described above, the angular frequency $\omega_0$ increases as the vehicle velocity becomes higher.

The variable resistor 360 is connected at one end thereof to the phase shifting circuit 310. The resistor 360 enable the gain of the output from the phase shifting circuit 310 to be varied by manually changing the resistance value of the resistor 360. Thus, the variable resistor 360 corresponds to a means for realizing the practical form of the fourth aspect of the present invention. The output terminal of the variable resistor 360 is connected to the differentail amplifier circuit 500, so that the rear wheel steer angle command signal as the output signal from the signal processing circuit 300 is supplied to the differential amplifier circuit 500 through the resistor 360.

Figure 12:
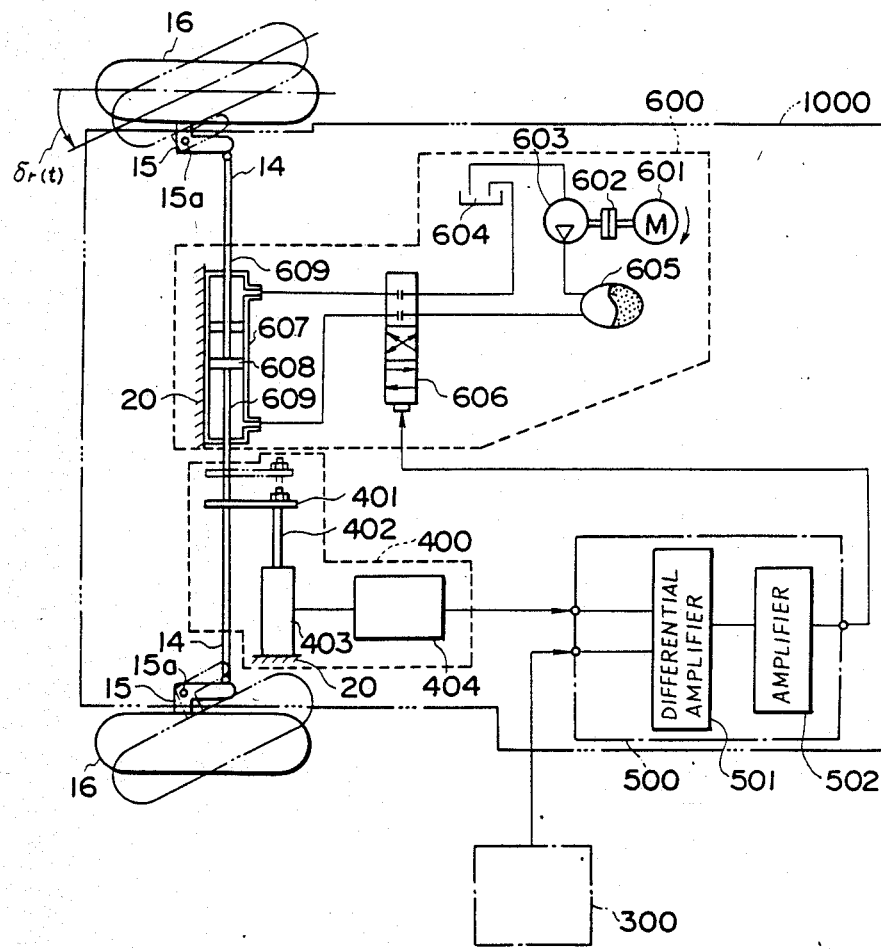
FIG. 12 shows the detail of an actuator mechanism used in the embodiment.

The actuator mechanism 1000 is, as shown in FIG. 12, constituted by the rear wheel steer angle detector 400 for detecting a steering amount corresponding to the steer angle of the rear wheels; the differential amplifier circuit 500 which amplifies a difference between the rear wheel steer angle command signal output from the signal processing circuit 300 and the actually measured rear wheel steer angle signal which is output from the rear wheel steer angle detector 400; the hydraulic device 600 which generates force in accordance with the level of the steer angle offset signal which is output from the differential amplifier circuit 500; the linkage 14 for transmitting this force to the rear wheels 16 and thereby steering the rear wheels 16 so as to form a steer angle; the knuckle arms 15; and the pivot points 15a.

The rear wheel steer angle detector 400 includes a linear potentiometer 403; a D.C. amplifier 404 and a connecting member 401. The linear potentiometer 403 is fixed to the chassis 20 of the vehicle and has a sliding end 402 retained by the connecting member 401 which makes a linear motion together with the linkage 14. In operation, the sliding end 402 makes a linear motion in response to the steering of the rear wheels 16, thus detecting the steer angle of the rear wheels 16 as a linear displacement and outputting an electric signal corresponding to this linear displacement.

The D.C. amplifier 404 is adapted to apply a predetermined voltage to the linear potentiometer 403, and amplifies the electric signal from the linear potentiometer 403, thus forming and delivering an actually measured rear wheel steer angle signal to the differential amplifier circuit 500. This signal representing the actually measured rear wheel steer angle has a polarity determined by the D.C. amplifier 404: namely, when the steer angle is formed such as to steer the rear wheels 16 clockwise, the signal takes the form of a positive voltage signal, whereas, when the steer angle is formed such as to steer the rear wheels 16 couter-clockwise, the signal takes the form of a negative voltage signal.

The differential amplifier circuit 500 is composed of a differential amplifier 501 and an amplifier 502. The differential amplifier 501 obtains a difference between a rear wheel steer angle command signal supplied thereto from the signal processing circuit 300 and an actually measured rear wheel steer angle signal supplied thereto from the rearwheel steer angle detector 400, and supplies a signal representing the thus obtained difference to the amplifier 502. The amplifier 502 amplifies the output signal from the differential amplifier 501 by a predetermined amplification factor, thus forming and delivering a steer angle offset signal to a flow rate control valve 606 of the hydraulic device 600 which generates force for actuating the rear wheels 16 so as to form a steer angle.

In consequence, the differential amplifier circuit 500 produces an offset signal which is obtained through amplification of the difference between the rear wheel steer angle command signal delivered from the signal processing circuit 300 and the measured rear wheel steer angle signal delivered from the rear wheel steer angle detector 400. The differential amplifier circuit 500, therefore, is a circuit essential for a feedback control which is carried out in such a manner as to nullify the offset. As a result of this feedback control conducted by virtue of the differential amplifier circuit 500, the rear wheel steer angle is controlled in such a manner as to nullify the offset, i.e., such as to coincide with the command steer angle.

The amplifier 502 in the differential amplifier circuit 500 is intended for affording a large power which may become necessary for allowing the control of the flow rate control valve 606 of the hydraulic device 600 to be controlled in a short time in a good response. In addition, the offset signal representing the offset of the rear wheel steer angle from the command value acts, when it has the form of a positive voltage, to generate a rear wheel steer angle in the direction for steering the rear wheels 16 clockwise. Conversely, when the command signal has the form of a negative voltage, it acts to generate a rear wheel steer angle such as to steer therear wheels 16 counter-clockwise. Further, if the flow rate control valve 606 is arranged such as to be controlled in accordance with the magnitude of current, a current amplifier circuit may be disposed in the amplifier 502 of the differential amplifier circuit 500 so that a current which is proportional to the voltage of the steer angle offset signal output from the amplifier 502 is supplied to the flow rate control valve 606.

The hydraulic device 600 includes a driving unit 601, a driving coupling 602, a pump 603, an oil tank 604, an accumulator 605, a flow rate control valve 606, and an actuator which is composed of a cylinder 607, a piston 608 and a piston rod 609.

The pump 603 is constituted by a vane pump which is driven by the driving unit 601 through the driving coupling 602, and is adapted to accumulate a predetermined pressure in the accumulator 605.

The oil tank 604 is connected to the suction side of the pump 603 and intended for recycling unnecessary oil.

The accumulator 605 is constituted by a metallic vessel having a predetermined internal volume. The space in the vessel is divided by a rubber diaphragm into two chambers: namely, a first chamber filled with a gas such as nitrogen gas of a predetermined pressure, and a second chamber which is connected to the discharge port of the pump 603 through a pipe. The accumulator 605 is intended for prevention of any operation failure of the pump 603 through compensation for any shortage of the discharge rate from the pump 603 in view of the demand by the differential amplifier circuit 500. The provision of the accumulator 605 contributes also to reduction in the capacity and size of the pump 603.

The flow rate control valve 606 is constituted by a spool valve having a cylinder provided with inlet and outlet ports, and a spool axially movably received in the cylinder, the spool having portions of different diameters. The effective passage area through the spool valve is determined by relative position between the outlet port and the larger-diameter portion of the spool and, hence, is varied in accordance with axial displacement of the spool, thus controlling the discharge rate. The flow rate control valve 606 delivers the hydraulic oil from the accumulator 605 to the actuator, while contolling the flow rate in accordance with the offset signal representing the offset of the rear wheel steer angle which is delivered from the differential amplifier circuit 500. It is to be noted here that an engine mounted on the vehicle may be employed as the driving unit 601. In such a case, the driving coupling 602 may be constituted by a belt which is used in combination with a pulley. The actuator is constituted by a hydraulic cylinder composed of the cylinder 607 fixed to the chassis 20 and the piston 608, and the piston rod 609 which is integrated with the linkage 14. The piston 608 and the piston rod 609 make a linear motion in response to the pressure of the hydraulic oil supplied and discharged through the flow rate control valve 606. This linear motion causes the knuckle arms C15 to rotate about their pivot points 15a through the linkage 14. The knuckle arms 15 turn toegether with the rear wheels 16, thus steering the rear wheels 16 so as to form a steer angle.

The following is a description of the actions and effects of the rear wheel steer angle controlling apparatus in accordance with the above-described embodiment of the present invention.

The steering wheel displacement detecting means 100 detects a linear displacement corresponding to the rotation angle $\delta h(t)$ of the steering wheel 1, and produces a corresponding electric signal (displacement signal) D (hereinafter referred to as a "steering wheel displacement signal D"). On the other hand, the vehicle velocity detector 200 detects a vehicle velocity V(t) and produces a corresponding electric signal E (hereinafter referred to as a "vehicle velocity signal E"). In order to simplify the explanation, it is assumed here that the steering wheel 1 is continuously operated in the form of a sine wave at an angular frequency of $\omega$, i.e., the steering wheel displacement signal D is expressed by $D = D_0 \sin\omega t$, where $D_0$ represents the maximum rotation of the steering wheel 1. The vehicle velocity signal E is amplified by a predetermined amplification factor by the inverting amplifier circuits 320, 330 and the resistor 340 in the signal processing circuit 300 and is then supplied to the CdS 352 in the CdS optoisolator 350. The resistance value R of the CdS 352 in the CdS optoisolator 350 is determined in accordance with the vehicle velocity singal E and an amplification factor which is determined by the inverting amplifier circuits 320, 330 and the resistor 340. In this case, the resistance value R decreases in accordance with the increase of the vehicle velocity V (the vehicle velocity signal E). The steering wheel displacement signal D is supplied to the phase shifting circuit 310 in the signal processing circuit 300. The phase shifting circuit 310 has transfer characteristics (shown in FIG. 11(A)) in accordance with which it produces an angular frequency $\omega_0$ at which a 90° phase shift is effected and which is expressed by $\omega_0 = 1/RC$, where R represents the resistance value of the CdS 352, and C represents the capacitance of the capacitor 314. Accordingly, when the angular frequency $\omega$ of the steering wheel displacement signal $D = D_0 \sin\omega t$ is lower than the angular frequency $\omega_0$, the phase shifting circuit 310 outputs an electric signal D equal to the steering wheel displacement signal D. On the other hand, when the angular frequency $\omega$ is higher than the angular frequency $\omega_0$, the circuit 310 outputs an electric signal $-D$ obtained by inverting the polarity of the steering wheel displacement signal D. At this time, when the vehicle velocity is extremely low, the resistance value R of the CdS 352 becomes extremely large as shown by the characteristic curve in FIG. 11(B), so that the angular frequency $\omega_0$ (expressed by $\omega_0 = 1/RC$) becomes extremely low. In such a case, the phase shifting circuit 310 exhibits characteristics equal to the transfer characteristics shown in FIG. 4(A) (i.e., k=1). In consequence, the steering wheel displacement signal D is output after it has been inverted in polarity (as an electric signal $-D$), except for the case where the angular frequency $\omega$ is extremely low. On the other hand, when the vehicle velocity is extremely high, the resistance value R of the CdS 352 becomes extremely small as shown in FIG. 11(B), so that the angular frequency $\omega_0$ (=1/RC) becomes extremely high. In such a case, the phase shifting circuit 310 exhibits its characteristics equal to the transfer characteristics shown in FIG. 4(C) (i.e., k=1). In consequence, the steering wheel displacement signal D is output without being inverted in polarity (as an electric signal D), except for the case where the angular frequency $\omega$ is extremely high. If, in this case, the set value for the resistance of the feedback resistor (variable resistor) 332 in the inverting amplifier circuit 330 is varied, the amplification factor by which the vehicle velocity signal E is amplified is changed. In consequence, the voltage of the electric signal supplied to the light-emitting diode 351 of the CdS optoisolator 350 is changed. As a result, the resistance value R of the CdS 352 is changed, so that it is possible to change the set value for the angular frequency $\omega_0$ (=1/RC). This is a means corresponding to that for realizing the practical form of the fifth aspect of the present invention. The variable resistor 360 amplifies the output from the phase shifting circuit 310 by a predetermined amplification factor, and supplies the thus amplified signal to the differential amplifier circuit 500. By manually setting the resistance value of the variable resistor 360 in advance, it is possible to set a magnitude of voltage of the electric signal supplied to the differential amplifier circuit 500. The electric signal output from the variable resistor 360 is the rear wheel steer angle command signal. It is therefore possible to selectively set the magnitude of voltage of the command signal by manually setting the resistance value of the variable resistor 360. This is a means corresponding to that for realizing the practical form of the third aspect of the present invention. The rear wheel steer angle detector 400 of the actuator mechanism 1000 detects a linear displacement of the linkage 14 to detect a displacement corresponding to the steer angle of the rear wheels 16 at that time, and supplies an actually measured rear wheel steer angle signal to the differential amplifier circuit 500. The circuit 500 produces and amplifies a signal representing the difference between the rear wheel steer angle command signal supplied thereto from the signal processing circuit 300 and the measured rear wheel steer angle signal from the rear wheel steer angle detector 400, and supplies the thus amplified signal as a steer angle offset signal to the flow rate control valve 606 of the hydraulic device 600.

The flow rate control valve 606 is controlled by the steer angle offset signal such as to introduce the pressure of hydraulic oil accumulated in the accumulator 605 into the actuator. In consequence, the pressure inside the cylinder of the actuator is changed, thus causing the piston 608 and the piston rod 609 to move.

The linkage 14 integrated with the piston rod 609 is moved by the hydraulic pressure to rotate the knuckle arms 15 about their pivot points 15a, thus steering the rear wheels 16 so as to form a steer angle.

This series of operations is quickly carried out until the steer angle offset signal becomes zero, i.e., until the steer angle of the rear wheels 16 becomes coincident with a magnitude and a direction corresponding to the steer angle command signal output from the signal processing circuit 300.

When the polarity of the rear wheel steer angle command signal is equal to that of the steering wheel displacement signal D, the rear wheels 16 are steered by the actuator mechanism 1000 in the same direction as the direction in which the steeringwheel 1 is turned, i.e., in the same direction as the steer angle of the front wheels 6, with a magnitude in accordance with an amplification factor which is determined by the variable resistor 360.

On the other hand, when the polarity of the rear wheel steer angle command signal is different from the polarity or sign of the steering wheel displacement signal D, the rear wheels 16 are steered in the direction counter to the direction in which the steering wheel 1 is turned, i.e., in the direction counter to the steer angle of the front wheels 6, with a magnitude in accordance with an amplification factor which is determined by the variable resistor 360. It is to be noted that, when the rear wheel steer angle command signal is zero, the rear wheels 16 are not steered, and the steer angle thereof is therefore zero.

As has been described above, the control apparatus in accordance with the embodiment of the present invention simplifies the construction of the signal processing circuit to facilitate the mounting of the apparatus on the vehicle, because the signal processing circuit is composed of a variable resistor and a simple phase shifting circuit having both the function of a judging means for judging the speed of operation of the steering wheel on the basis of the angular frequency $\omega$ of rotation of the steering wheel and the function of a processing means for outputting a control signal for controlling the actuator mechanism which corresponds to the speed of rotation of the steering wheel. In addition, in the signal processing circuit in accordance with the embodiment of the present invention, a CdS optoisolator having a simple structure is employed as a means for changing a predetermined reference value for judgement of the speed of operation of the steering wheel in accordance with a physical amount related to the vehicle velocity. Accordingly, the control apparatus according to the present invention has no complicated circuit configuration and is therefore suitably mounted on the vehicle. In addition, the apparatus can be realized at a reduced cost. According to the embodiment of the present invention, when the steering wheel is turned slowly, the rear wheels are steered in the same direction as the steer angle of the front wheels, whereas, when the steering wheel is turned quickly, the rear wheels are steered in the direction counter to the steer angle of the front wheels. It is therefore possible to improve both the running stability during straight running of the vehicle and the response to a steering input for a quick turn of the vehicle. Further, it is possible, according to the embodiment of the present invention, to increase, in accordance with the increase of the vehicle velocity, the reference (the angular frequency $\omega_0$ at which a 90° phase shift is effected in accordance with the transfer characteristics of the phase shifting circuit) employed to judge the speed of operation of the steering wheel in order to determine a direction of steer angle of the rear wheels with respect to the direction of steer angle of the front wheels. For this reason, when the vehicle is running at low speed (except for the case where the steering wheel is turned very slowly as in the case of effecting a normal circular turn), the radius of turn of the vehicle can be reduced by steering the rear wheels in the direction counter to the steer angle of the front wheels, so that it is possible to facilitate garaging and changing of the course of the vehicle. When the vehicle is running at very high speed (except for the case where the steering wheel is turned very quickly in order to cope with an emergency situation or to avert from an obstacle), the rear wheels are steered in the same direction as the steer angle of the front wheels, thereby preventing a sudden rise in sensitivity of the vehicle to a steering input for turning of it, and thus enabling stable running of the vehicle. Further, the signal processing circuit in accordance with the embodiment of the present invention is characterized in that the speed of operation of the steering wheel is judged on the basis of the angular frequency of rotation of the steering wheel, that the output control signal has a time lag with respect to the input displacement signal up to 180° in accordance with the increase of the angular frequency such as to have an absolute value which is obtained by amplifying the input displacement signal by a factor which is constant regardless of the angular frequency, and that the reference for judgement varies in accordance with the vehicle velocity. Therefore, the phase shifting circuit, the CdS optoisolator, etc., which are employed in the signal processing circuit according to the embodiment, are not necessarily limitative, and it is possible to employ any circuit which can judge the speed of operation of the steering wheel by the angular frequency of the steering wheel and increase the value of reference for judgement of the speed of rotation of the steering wheel in accordance with the vehicle velocity, on the basis of the idea of the present invention set forth in the appended claims. In the above-described embodiment, a CdS optoisolator is employed as a means for changing a predetermined angular frequency $\omega_0$ of the steering wheel corresponding to a predetermined reference value for judgement of the speed of operation of the steering wheel, in accordance with the change of a physical amount related to the vehicle velocity, and the resistance value R of the phase shifting circuit, i.e., R in the following expression $$\omega_0 = 1/RC$$

is changed by the CdS optoisolator. The present invention, however, is not necessarily limited to the CdS optoisolator.

For example, as a means for changing a predetermined angular frequency $\omega_0$ of the steering wheel by varying the resistance value R, it is possible to employ a voltagecontrolled variable-resistance multiplier, a switched capacitor, etc. It is also possible to change the angular frequency $\omega_0$ by varying the capacitance C of the capacitor in the phase shifting circuit. For example, a voltage-controlled variable-capacitance multiplier may be employed for this purpose. In the above-described embodiment, the linear motion obtained through a motion converting mechanism such as a rack and pinion incorporated in the gear box is detected in place of the rotation angle of the steering wheel as the steering wheel displacement. This, however, is not necessarily exclusive and the steering wheel displacement can be detected through the detection of angle of rotation of the knuckle arms or the steer angle of the front wheels.

Although a linear potentiometer is used as the detecting means in the described embodiment, it is possible to use various sensors such as a magnetic sensor responsive to a change in the magnetic flux corresponding to the angle of rotation of the steering wheel, an optical sensor or a telemeter, as the detecting means for detecting the steering wheel displacement. The described construction of the control means is not exclusive and various other circuits are usable provided that such circuits are capable of judging the speed of operation of the steering wheel and outputting a control signal corresponding to the result of the judgement, and the reference for judgement is variable in accordance with the vehicle velocity. It is to be understood also that the analog circuit used in the described embodiment may be substituted by a digital circuit employing, for example, a microcomputer. The construction of the actuator mechanism used in the described embodiment is also illustrative, and any mechanism capable of controlling the rear wheel steer angle by a force corresponding to the control output signal from the control means can be used as the actuator mechanism. For example, the actuator mechanism may be constituted by a hydraulic circuit, pneumatic circuit, pneumatic actuator, hydraulic actuator, or an electromagnetic actuator.

What is claimed is:

1. A rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle, said apparatus comprising:
   a steering wheel displacement detecting means for detecting a steering wheel displacement and for generating a steering wheel displacement signal representing the steering wheel displacement;
   a physical amount detecting means for detecting a physical amount related to a velocity of said vehicle and outputting a physical amount signal; and
   a control means adapted to: calculate a speed of operation of said steering wheel on the basis of said steering wheel displacement signal, set a reference value which varies in accordance with said physical amount signal, make a comparison between the speed of operation of said steering wheel and said reference value, and control said actuator mechanism in accordance with the result of the comparison such that:
   (a) when the speed of operation of said steering wheel is smaller than said reference value, the steer angle of said rear wheels is generated in the same direction as the steer angle of said front wheels; and
   (b) when the speed of operation of said steering wheel is larger than said reference value, the steer angle of said rear wheels is generated in the direction counter to a direction of steer angle of said front wheels.

2. A rear wheel steer angle controlling apparatus according to claim 1, said control means further comprising means for controlling the amount of the movement of said actuator mechanism in response to the level of said steering wheel displacement signal and controlling said actuator mechanism in accordance with the result of the comparison such that:
   (a) when the speed of operation of said steering wheel is smaller than said reference value, the steer angle of said rear wheels corresponding to the level of said steering wheel displacement signal is generated in the same direction as the steer angle of said front wheels; and
   (b) when the speed of operation of said steering wheel is larger than said reference value, the steer angle of said rear wheels corresponding to the level of said steering wheel displacement signal is generated in the direction counter to a direction of steer angle of said front wheels.

3. A rear wheel steer angle controlling apparatus according to claim 2, wherein the rate of change of the reference value which varies in accordance with said physical amount signal is made adjustable.

4. A rear wheel steer angle controlling apparatus according to claim 1, wherein said control means comprises:
   a calculating means for calculating an angular frequency of said steering wheel corresponding to a speed of operation of said steering wheel on the basis of said steering wheel displacement signal;
   a setting means for setting a reference value which may vary continuously form a very small value close to zero in accordance with changes in a physical amount related to said vehicle velocity;
   a judging means for making judgement as to whether said angular frequency is larger or smaller than said reference value by making a size comparison therebetween; and
   a processing means for controlling said actuator mechanism on the basis of the level of said steering wheel displacement signal and the result of judgement by said judging means such that:
   (a) when said angular frequency is smaller than said reference value, said steering wheel displacement signal is amplified by a predetermined amplification factor and output to said actuator mechanism; and
   (b) when said angular frequency is larger than said reference value, said steering wheel displacement signal is inversely amplified by a predetermined amplification factor and output to said actuator mechanism.

5. A rear wheel steer angle controlling apparatus according to claim 1, wherein said control means comprises:
   a calculating means for calculating an angular frequency of said steering wheel corresponding to a speed of operation of said steering wheel on the basis of said steering wheel displacement signal;
   a setting means for setting a reference value which progressively increases from a very small value close to zero as a physical amount related to said vehicle velocity becomes greater;
   a judging means for making judgement as to whether said angular frequency is larger or smaller than said reference value by making a size comparison therebetween; and
   a processing means for controlling the direction of the movement in said actuator mechanism on the basis of the result of judgement by said judging means and controlling the amount of the movement in said actuator mechanism in response to the level of said steering wheel displacement signal such that:
   (a) when said angular frequency is smaller than said reference value, the steer angle of said rear wheels corresponding to the level of said steering wheel displacement signal is generated in the same direction as the steer angle of said front wheels; and
   (b) when said angular frequency is larger than said reference value, the steer angle of said rear wheels corresponding to the level of said steering wheel displacement signal is generated in the direction counter to a direction of the steer angle of said front wheels.

6. A rear wheel steer angle controlling apparatus according to claim 5, wherein said calculating means, judging means and processing means of said control means comprises a phase shifting means.

7. A rear wheel steer angle controlling apparatus according to claim 6, wherein the phase delay α0 in said phase shifting means is varied as follows:

$$90° < \alpha \leq 180°.$$

8. A rear wheel steer angle controlling apparatus according to claim 5, wherein the ratio of the magnitude of steer angle of said rear wheels to the level of said steering wheel displacement signal is made adjustable.

9. A rear wheel steer angle controlling apparatus according to claim 1, wherein the ratio of the magnitude of steer angle of said rear wheels to the level of said steering wheel displacement signal is made adjustable.

10. A rear wheel steer angle controlling apparatus according to claim 1, wherein said control means comprises:
a phase shifting means including a resistor having a resistance value R and a capacitor having a capacitance C and adapted for outputting a signal for controlling said actuator mechanism, said output signal being obtained by delaying the phase of said steering wheel displacement signal in such a manner that, when the angular frequency of said steering wheel displacement signal is equal to a frequency $\omega_0$ which is expressed by 1/RC, the phase of said steering wheel displacement signal is delayed 90°, and that, when said angular frequency is not equal to said frequency $\omega_0$, the phase of said steering wheel displacement signal is shifted so as to have a phase delay which is varied from 0° to 180° as said angular frequency increases from a region which is smaller than said frequency $\omega_0$ to a region which is greater than said frequency $\omega_0$; and
a changing means for increasing said frequency $\omega_0$ from a very small value close to zero as a physical amount related to said vehicle velocity becomes greater by changing either said resistance value R or said capacitance C on the basis of said physical amount signal.

11. A rear wheel steer angle controlling apparatus according to claim 10, wherein said regions in which the phase of said steering wheel displacement is shifted so as to have a phase delay which is varied from 0° to 180° are those which are within a predetermined range around said frequency $\omega_0$, and wherein, when the angular frequency of said steering wheel displacement signal is smaller than the values within said predetermined range, the phase of said steering wheel displacement signal is delayed 0°, whereas, when said angular frequency is greater than the values within said predeterminned range, the phase of said steering wheel displacement signal is delayed 180°.

12. A rear wheel steer angle controlling apparatus according to claim 1, wherein said control means comprises:
a calculating means for calculating an angular frequency of said steering wheel corresponding to a speed of operation of said steering wheel on the basis of said steering wheel displacement signal;
a setting means for setting a reference frequency which progressively increases from a very small value close to zero as a physical amount related to said vehicle velocity becomes greater;
a judging means for making judgement as to whether said angular frequency is larger or smaller than said reference frequency by making a size comparison therebetween; and
a processing means for controlling said actuator mechanism on the basis of the level of said steering wheel displacement signal and the result of judgement by said judging means such that:
(a) when said angular frequency takes a value within a predetermined range around said reference frequency, a signal which is obtained by multiplying said steering wheel displacement signal by a predetermined factor is output to said actuator mechanism, said output signal having a 90° phase delay with respect to said steering wheel displacement signal when said angular frequency is equal to said reference frequency, said phase delay being varied from 0° to 180° as said angular frequency increases from a region which is smaller than said reference frequency to a region which is greater than said reference frequency;
(b) when said angular frequency is smaller than the values within said predetermined range, a signal which is obtained by multiplying said steering wheel displacement signal by a predetermined factor is output to said actuator mechanism, said output signal being in phase with said steering wheel displacement signal; and
(c) when said angular frequency is greater than the values within said predetermined range, a signal which is obtained by multiplying said steering wheel displacement signal by a predetermined factor is output to said actuator mechanism, said output signal having a 180° phase delay with respect to said steering wheel displacement signal.

13. A rear wheel steer angle controlling apparatus for automatically controlling a steer angle of rear wheels of a vehicle by controlling an actuator mechanism for generating the steer angle of the rear wheels in response to an operation of a steering wheel for generating a steer angle of front wheels of said vehicle, said apparatus comprising:
a steering wheel displacement detector for detecting an amount by which said steering wheel is turned as a linear displacement and for outputting a displacement signal representing the linear displacement;
a vehicle velocity detector for detecting a velocity of said vehicle and outputting a vehicle velocity signal;
a phase shifting circuit including a resistor having a resistance value R and a capacitor having a capacitance C and adapted for outputting a command signal which is obtained in such a manner that, when the angular frequency of said displacement signal is equal to a frequency $\omega_0$ which is expressed by 1/RC, the phase of said displacement signal is delayed 90°, whereas, when said angular frequency is not equal to said frequency $\omega_0$, the phase of said displacement signal is shifted so as to have a phase delay which is varied from 0° to 180° as said angular frequency increases from a region which is smaller than said frequency $\omega_0$ to a region which is greater than said frequency $\omega_0$;
a frequency changing circuit for increasing said frequency $\omega_0$ from a very small value close to zero as said vehicle velocity increases by changing either said resistance value R or said capacitance C on the basis of said vehicle velocity signal;
a rear wheel steer angle detector for detecting a steer angle of said rear wheels as a linear displacement and outputting an actually measured signal; and a differential amplifier adapted to obtain an offset signal representing a difference between said command signal and said measured signal and control said actuator mechanism on the basis of said offset signal.

14. A rear wheel steer angle controlling apparatus according to claim 13, wherein said phase shifting circuit comprises:
   an operational amplifier having an inverting terminal and a non-inverting terminal;
   a capacitor connected to one end thereof to the non-inverting terminal of said operational amplifier and grounded at the other end thereof;
   a variable resistor connected at one end thereof to the output terminal of said steering wheel displacement detector and at the other end thereof to the non-inverting terminal of said operational amplifier, the resistance value of said resistor being varied by said frequency changing circuit so as to decrease as the vehicle velocity increases;
   an input resistor connected at one end thereof to the output terminal of said steering wheel displacement detector and at the other end thereof to the inverting terminal of said operational amplifier; and
   a feedback resistor connected at one end thereof to the inverting terminal of said operational amplifier and at the other end thereof to the output terminal of said operational amplifier.

15. A rear wheel steer angle controlling apparatus according to claim 14, wherein said variable resistor is a photoconductive cell which constitutes an optoisolator.

16. A rear wheel steer angle controlling apparatus according to claim 15, wherein said frequency changing circuit comprises:
   a first inverting amplifier circuit for inversely amplifying said vehicle velocity signal by a predetermined amplification factor;
   a second inverting amplifier circuit including a feedback resistor whose resistance value is variable by a manual operation, said second inverting amplifier circuit being adapted for inversely amplifying the output of said first inverting amplifier circuit by an amplification factor corresponding to the resistance value of said feedback resistor; and
   a light-emitting element constituting an optoisolator and caused to emit light by the output of said second inverting amplifier circuit.

17. A rear wheel steer angle controlling apparatus according to claim 14, wherein said input resistor and said feedback resistor have an equal resistance value.

18. A rear wheel steer angle controlling apparatus according to claim 13, wherein said frequency changing circuit has a function which enables the rate of increase of said frequency $\omega_0$ to be varied by a manual operation.

19. A rear wheel steer angle controlling apparatus according to claim 13, wherein said phase shifting circuit has a function which enables the gain of said command signal to be varied by a manual operation.

20. A rear wheel steer angle controlling apparatus for automatically controlling a steer angle of rear wheels of a vehicle in response to an operation of a steering wheel for generating a steer angle of front wheels of said vehicle, said apparatus comprising:
   a first displacement detector for detecting a displacement of a linkage connected to said front wheels;
   a vehicle velocity detector for detecting a velocity of said vehicle;
   an operational amplifier whose amplification factor is adjustable, said amplifier having an inverting terminal and a non-inverting terminal and provided with a feedback resistor connected between said inverting terminal and the output terminal thereof, said inverting terminal being connected to said first displacement detector through an input resistor whose resistance value is equal to that of said feedback resistor;
   a capacitor connected at one end thereof to the non-inverting terminal of said operational amplifier and grounded at the other end thereof;
   a photoconductive cell connected at one end thereof to the non-inverting terminal of said operational amplifier and at the other end thereof to said first displacement detector;
   a first inverting amplifier having a predetermined amplification factor and connected to said vehicle velocity detector;
   a second inverting amplifier whose amplification factor is adjustable and which is connected to the output terminal of said first inverting amplifier;
   a light-emitting element connected at one end thereof to the output terminal of said second inverting amplifier and grounded at the other end thereof, said light-emitting element being disposed in opposing relation to said photoconductive cell;
   a second displacement detector for detecting a displacement of a linkage connected to said rear wheels;
   a differential amplifier connected at one input terminal thereof to the output terminal of said operational amplifier and at the other input terminal to said second displacement detector;
   a flow rate control valve controlled by the output of said differential amplifier;
   an actuator for displacing the linkage connected to said rear wheels; and
   a hydraulic pressure generating device for supplying hydraulic pressure to said actuator through said flow rate control valve.

* * * * *